United States Patent
Shimizu

(10) Patent No.: US 11,812,392 B2
(45) Date of Patent: Nov. 7, 2023

(54) WIRELESS COMMUNICATION APPARATUS AND BEAM CONTROL METHOD

(71) Applicant: FUJITSU LIMITED, Kawasaki (JP)

(72) Inventor: Masahiko Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 194 days.

(21) Appl. No.: 17/529,333

(22) Filed: Nov. 18, 2021

(65) Prior Publication Data

US 2022/0279458 A1 Sep. 1, 2022

(30) Foreign Application Priority Data

Feb. 26, 2021 (JP) ................................. 2021-029560

(51) Int. Cl.
*H04W 52/24* (2009.01)
*H04W 72/044* (2023.01)
*H04W 52/36* (2009.01)

(52) U.S. Cl.
CPC ....... *H04W 52/241* (2013.01); *H04W 52/367* (2013.01); *H04W 72/046* (2013.01)

(58) Field of Classification Search
CPC ............ H04W 52/241; H04W 52/367; H04W 72/046
See application file for complete search history.

(56) References Cited

U.S. PATENT DOCUMENTS 10,530,448 B1 * 1/2020 Tran ..................... H04B 7/0617
10,594,383 B1 * 3/2020 Orhan .................. H04B 7/0617
2011/0281600 A1 11/2011 Tanaka
(Continued)

FOREIGN PATENT DOCUMENTS

JP 2010-171734 A 8/2010

OTHER PUBLICATIONS

Toru Takahashi, "Chapter 7 Array Antenna", Knowledge Forest(http://www.ieice-hbkb.org/) of the Society of Electronics and Communication, 4 Group-2-Chapter 7, Group 4 (Communication Engineering)—Part 2 (Antenna/propagation), pp. 1-23 (Translation of the relevant part (pp. 1-18), Publication Date : Mar. 29, 2013 (Total 41 pages).
(Continued)

*Primary Examiner* — Raymond S Dean
(74) *Attorney, Agent, or Firm* — Fujitsu Patent Center

(57) ABSTRACT

A wireless communication apparatus outputs first and second beams, based on a weighting vector representing gain and/or phase weighting. The apparatus derives a weighting vector corresponding to a maximum eigen value of a matrix obtained by subtracting, from a first matrix representing a main lobe output power of the first beam, a matrix obtained by multiplying a second matrix representing a side lobe output power of the first beam to a reduction ratio for reducing the side lobe output power of the first beam interfering with a main lobe of the second beam. The apparatus determines whether or not a power ratio of the main lobe output power of the first beam with respect to the side lobe output power of the first beam is greater than a maximum $SIR_{max}$, and extracts the weighting vector when the power ratio is not larger than the maximum $SIR_{max}$.

14 Claims, 15 Drawing Sheets

(56) References Cited

U.S. PATENT DOCUMENTS

| | | | | |
|---|---|---|---|---|
| 2013/0016003 | A1* | 1/2013 | Stirling-Gallacher | H01Q 3/26 342/372 |
| 2016/0211577 | A1* | 7/2016 | Miller | H04K 3/43 |
| 2017/0047656 | A1* | 2/2017 | Bocskor | H01Q 9/0407 |
| 2018/0011180 | A1* | 1/2018 | Warnick | H01Q 3/34 |
| 2019/0253125 | A1* | 8/2019 | Apaydin | H01Q 21/22 |
| 2020/0382196 | A1* | 12/2020 | Mohandoss | H04B 7/0695 |

OTHER PUBLICATIONS

Xiao Xiao et al., "Data-Based Model for Wide Nulling Problem in Adaptive Digital Beamforming Antenna Array", IEEE Antennas and Wireless Propagation Letters, vol. 18, No. 11, pp. 2249-2253, Nov. 2019 (Total 5 pages).

* cited by examiner

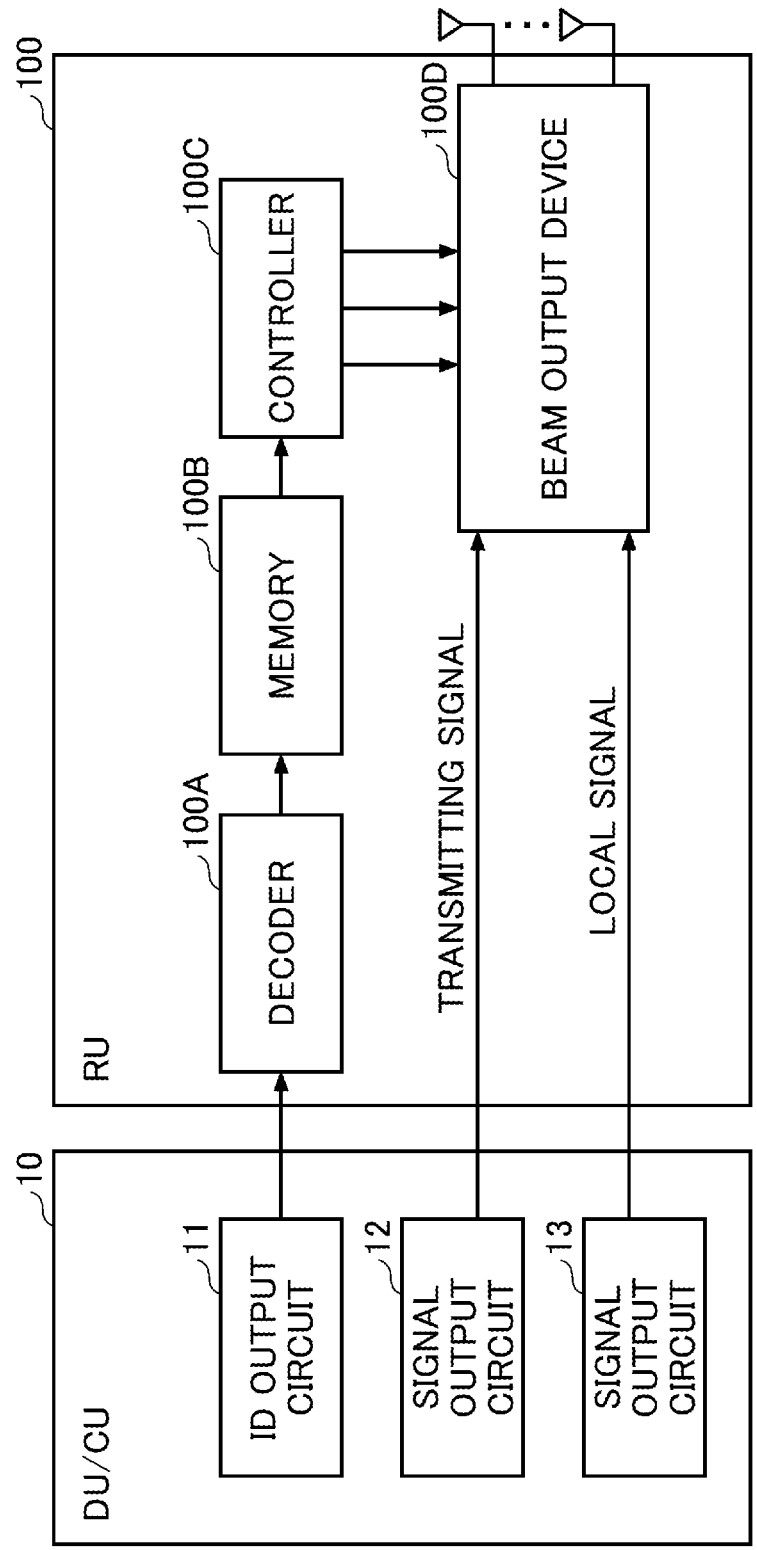

FIG.7

| BEAM ID | DISTANCE | POWER CONSTRAINT OF MAIN LOBE |
|---|---|---|
| ID0 | $r_0$ | $\dfrac{r_0{}^2}{r_3{}^2} P_A$ |
| ID1 | $r_1$ | $\dfrac{r_1{}^2}{r_3{}^2} P_A$ |
| ID2 | $r_2$ | $\dfrac{r_2{}^2}{r_3{}^2} P_A$ |
| ID3 | $r_3$ | $P_A$ |

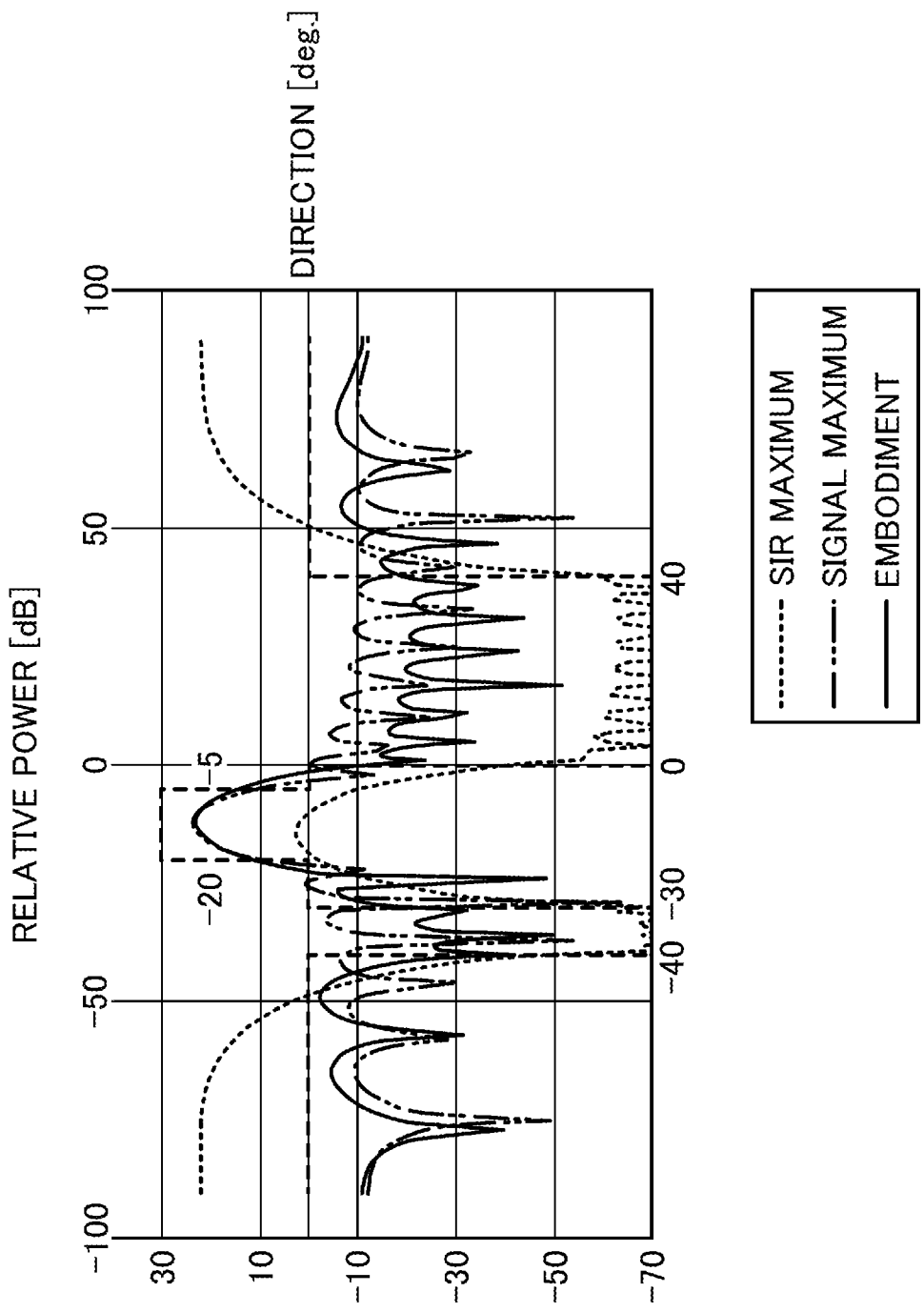

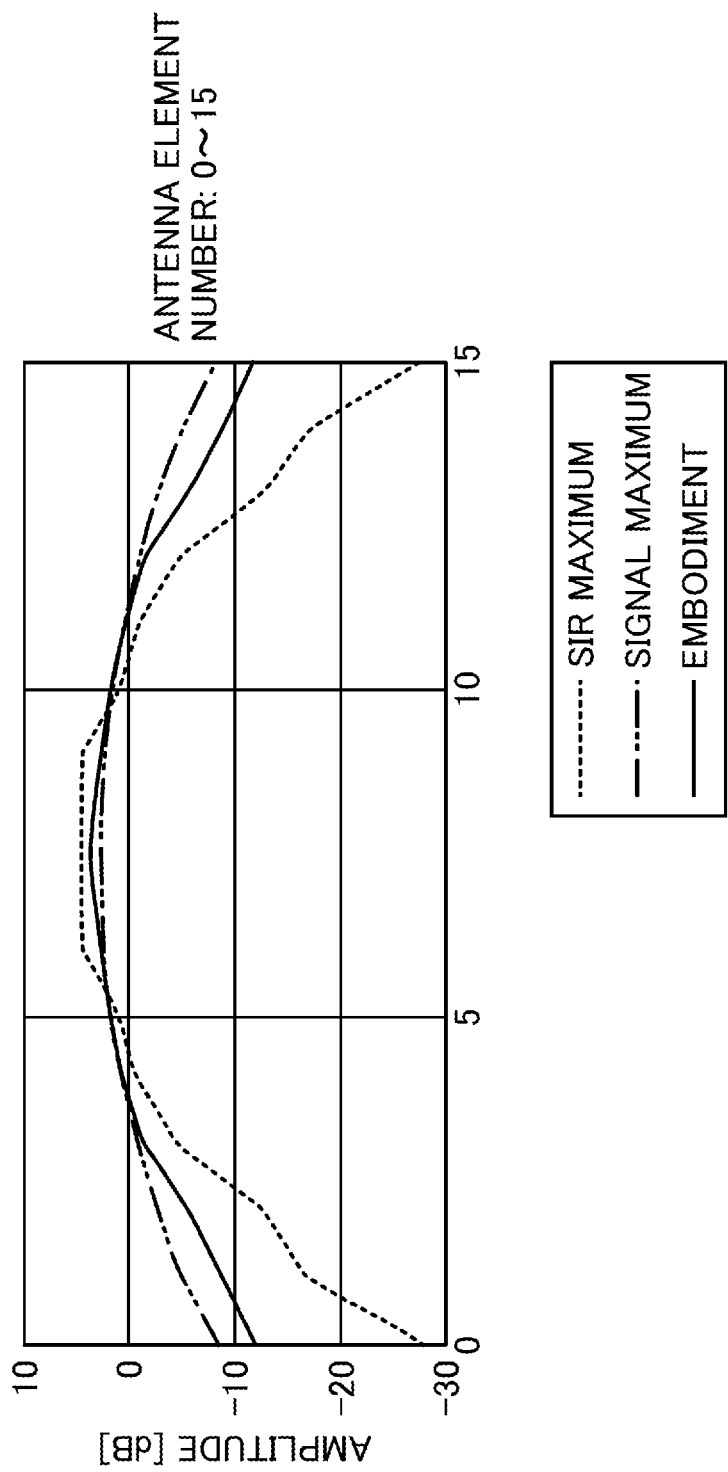

WIRELESS COMMUNICATION APPARATUS AND BEAM CONTROL METHOD

CROSS-REFERENCE TO RELATED APPLICATIONS

This application is based upon and claims the benefit of priority of the prior Japanese Patent Application No. 2021-029560, filed on Feb. 26, 2021, the entire contents of which are incorporated herein by reference.

FIELD

The embodiments discussed herein are related to wireless communication apparatuses, and beam control methods.

BACKGROUND

Conventionally, when outputting a beam from an array antenna which has a plurality of antenna elements arranged in an array, a method for weighting at least one of a gain and a phase of a signal output from the plurality of antenna elements based on a bat algorithm has been proposed, in order to reduce an output of a side lobe in a particular direction. Such a method is proposed in X. Xiao et al., "Data-Based Model for Wide Nulling Problem in Adaptive Digital Beamforming Antenna Array", IEEE Antennas and Wireless Propagation Letters, Vol. 18, No. 11, pp. 2249-2253, November 2019, for example.

However, according to the conventional method which employs an iterative operation, such as the bat algorithm, it is difficult to avoid a dip to a local minimum, and an optimum value of the weighting for reducing the output of the side lobe in the particular direction may not always be obtainable.

SUMMARY

Accordingly, one aspect of the embodiments provides a wireless communication apparatus and a beam control method, which can positively obtain an optimum value of the weighting for reducing the output of the side lobe in the particular direction.

According to one aspect of the embodiments, a wireless communication apparatus includes a plurality of antenna elements configured to output a first beam and a second beam, based on a weighting vector representing weighting with respect to at least one of a gain and a phase; and a processor configured to perform a process including deriving a weighting vector corresponding to a maximum eigen value of a matrix obtained by subtracting, from a first matrix representing an output power of a main lobe of the first beam, a second matrix obtained by multiplying a second matrix representing an output power of a side lobe of the first beam to a reduction ratio for reducing the output power of the side lobe of the first beam interfering with a main lobe of the second beam, determining whether or not a power ratio of the output power of the main lobe of the first beam, obtained by multiplying the weighting vector and a complex conjugate transpose of the weighting vector to the first matrix, with respect to the output power of the side lobe of the first beam, obtained by multiplying the weighting vector and the complex conjugate transpose of the weighting vector to the second matrix, and extracting the weighting vector when determining determines that the power ratio is not larger than the maximum $SIR_{max}$.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a block diagram illustrating a base station and a wireless communication apparatus according to one embodiment.

FIG. 7 is a diagram illustrating data relating a beam ID, a distance, and a power constraint of the main lobe.

FIG. 11 is a diagram illustrating a beam distribution.

FIG. 12A and FIG. 12B are diagrams illustrating an output and a phase of each antenna element.

DESCRIPTION OF EMBODIMENTS

Preferred embodiments of the present invention will be described with reference to the accompanying drawings.

A description will now be given of a wireless communication apparatus and a beam control method according to each embodiment of the present invention.

Figure 1B:
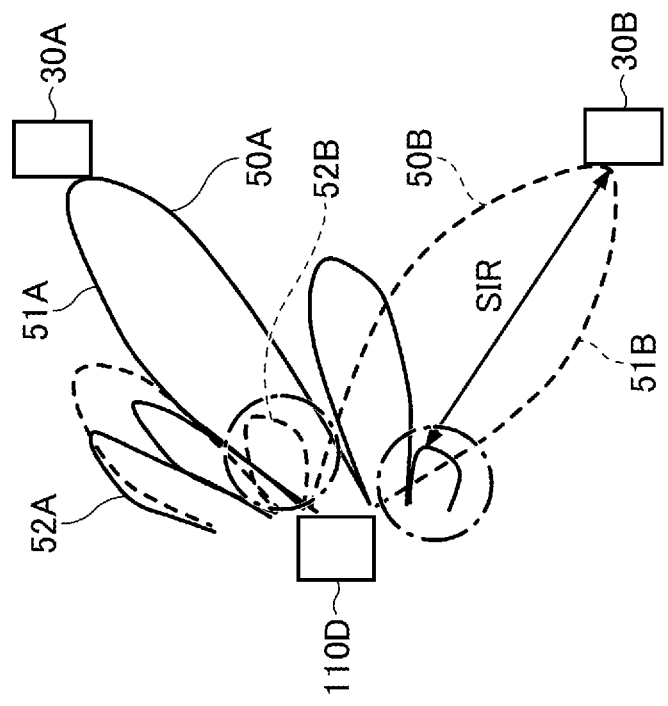
FIG. 1A and FIG. 1B are diagrams illustrating two beams.
Figure 1A:
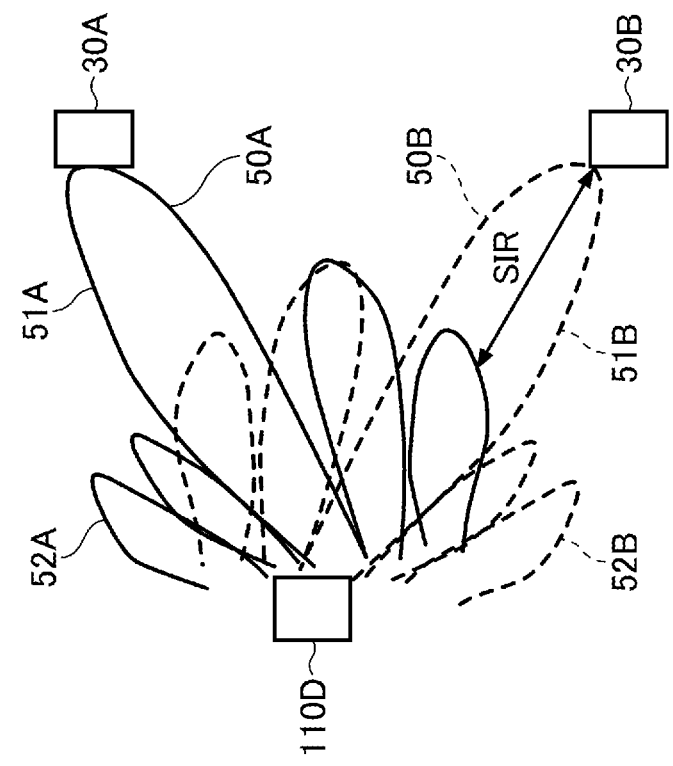

FIG. 1A and FIG. 1B illustrate two beams 50A and 50B. It is assumed that the two beams 50A and 50B are output from a single array antenna which has a plurality of antenna elements arranged in an array. In this example, the beam 50A is indicated by a solid line, and the beam 50B is indicated by a dashed line. In addition, for the sake of convenience, FIG. 1A and FIG. 1B indicate a magnitude of each Signal-to-Interference Ratio (SIR: a ratio of a signal power and an interfering power) by a length of each double-headed arrow. Further, terminals 30A and 30B may be smartphones or the like, for example.

The beam 50A includes one main lobe 51A, and a plurality of side lobes 52A. The beam 50B includes one main lobe 51B, and a plurality of side lobes 52B. The main lobe 51A is output from the array antenna toward the terminal 30A, and the main lobe 51B is output from the array antenna toward the terminal 30B.

A phase shifter and an amplifier are connected to each antenna element to adjust a phase and a gain of a signal output from each antenna element, and an output and an angle (radiating direction) of each of the two beams 50A and 50B can be adjusting by weighting at least one of the phase and the gain of the signal. In addition, by adjusting the weighting, it is possible to control (reduce) the output of one or a plurality of particular side lobes among the plurality of side lobes 52A and 52B.

FIG. 1A illustrates a state where the output of the side lobes 52A and 52B is not reduced, for comparison purposes. FIG. 1B illustrates a state where the output of a particular one of the side lobes 52A and 52B is reduced.

In FIG. 1A, the main lobe 51A of the beam 50A and the side lobes 52B of the beam 50B overlap, and the output of the side lobes 52B is large to a certain extent. Similarly, the main lobe 51B of the beam 50B and the side lobes 52A of the beam 50A overlap, and the output of the side lobes 52A is large to a certain extent. In this state, the interference between the main lobe 51A and the side lobes 52B is large, and the SIR between the main lobe 51A and the side lobes 52B is small. Similarly, the interference between the main lobe 51B and the side lobes 52A is large, and the SIR between the main lobe 51B of the beam 50B and the side lobes 52A of the beam 50A is small. When the SIR is small, a communication state is not good because of a throughput of the communication deteriorates.

On the other hand, in FIG. 1B, when compared to FIG. 1A, the outputs of the side lobes 52A and 52B overlapping the main lobes 51A and 51B are reduced, as illustrated inside circles indicated by a one-dot chain line. For this reason, the interference between the main lobe 51A and the side lobes 52B is small, and the SIR between the main lobe 51A and the side lobes 52B is large. Similarly, the interference between the main lobe 51B and the side lobes 52A is small, and the SIR between the main lobe 51B and the side lobes 52A is large. When the SIR is large, a good communication state can be obtained because the throughput of the communication improves.

As illustrated in FIG. 1B, the outputs of the side lobes 52A and 52B overlapping the main lobes 51A and 51B can be reduced, by adjusting the weight on the gain of each amplifier when amplifying each signal by the amplifier, and individually adjusting the gains of the signals output from the antenna elements.

FIG. 2 is a block diagram illustrating a base station 10, and a wireless communication apparatus 100 according to one embodiment. The base station 10 is formed by a distributed unit (DU), and a central unit (CU). The base station 10 includes an ID output circuit 11, and signal output circuits 12 and 13. The base station 10 includes components other than the ID output circuit 11 and the signal output circuits 12 and 13, however, illustration of such other components will be omitted.

The ID output circuit 11 outputs an identifier (ID) number to a decoder 100A of the wireless communication apparatus 100. The ID number output from the ID output circuit 11 includes multiple kinds of ID numbers. Each kind of ID number is allocated to information related to a direction of a beam output from the array antenna of a beam output device 100D of the wireless communication apparatus 100. The signal output circuit 12 outputs a transmitting signal to the beam output device 100D of the wireless communication apparatus 100. The signal output circuit 13 outputs a local signal to the beam output device 100D of the wireless communication apparatus 100.

The wireless communication apparatus 100 may be a radio unit (RU). The wireless communication apparatus 100 includes the decoder 100A, a memory 100B, a controller 100C, and the beam output device 100D. The decoder 100A decodes the ID number input from the ID output circuit 11 to acquire an address, and supplies the address to the memory 100B. The memory 100B includes a memory controller, and reads control data therefrom based on the address input from the decoder 100A, and supplies the read control data to the controller 100C. The control data includes gain weighting data for weighting the gain when amplifying the transmitting signal in the beam output device 100D, and phase weighting data for weighting a phase when shifting the phase of the transmitting signal.

The controller 100C controls an amplification and a phase shift of the transmitting signal input to the beam output device 100D, using the gain weighting data and the phase weighting data input from the memory 100B. The controller 100C may be formed by an integrated circuit (IC), for example.

The base station 10 and the wireless communication device 100 are devices for data communication in conformance with the fifth generation mobile communication system (5G), for example. The beam output device 100D of the wireless communication apparatus 100 can simultaneously output a plurality of beams, such as the beams 50A and 50B illustrated in FIG. 1B, by beam forming. The number of beams output from the beam output device 100D may be three or more. One beam among the three or more beams is an example of a first beam. One beam having a main lobe interfering with the side lobes of the first beam, among the three or more beams, is an example of a second beam.

Figure 3:
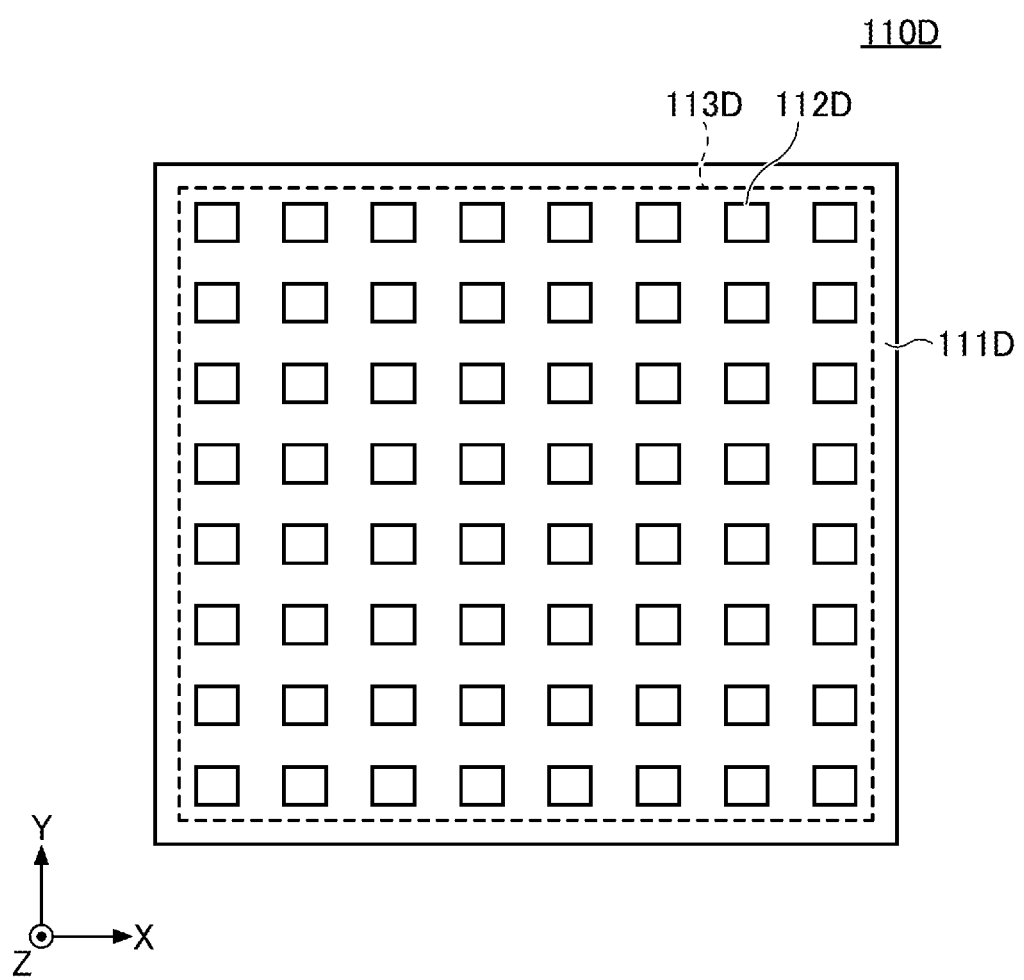
FIG. 3 is a diagram illustrating an array antenna of a beam output device.

FIG. 3 is a diagram illustrating an array antenna 110D of the beam output device 100D. The XYZ coordinate system will be defined as follows in the following description. In addition, a plan view refers to a view of an XY plane. For the sake of convenience, a −Z direction may also be referred to as a direction toward a bottom or a downward direction, and a +Z direction may also be referred to as a direction toward a top or an upward direction, however, such a directional relationship does not represent a universal up-and-down (or vertical) relationship.

The array antenna 110D includes a substrate 111D, antenna elements 112D, and a ground layer 113D. A communication frequency of the array antenna 110D may be in a 3.7 GHz band, a 4.5 GHz band, or a 28 GHz band, for example.

The substrate 111D may be a wiring board in conformance with the flame retardant type 4 (FR4) standard, for example. The antenna elements 112D are provided on a top surface of the substrate 111D, and the ground layer 113D is provided on a bottom surface. The antenna elements 112D are arranged in an array on the top surface of the substrate 111D, and for example, 64 antenna elements 112D, made up of an array of 8×8 antenna elements 112D, are arranged at a constant pitch in both the X direction and the Y direction. The array of the antenna elements 112D may also be treated as a matrix. The antenna element 112D has a square shape in the plan view, and a length of one side of the square is set to approximately ½ an electrical length in wavelengths at the communication frequency. Because the ground layer 113D is provided on the bottom surface of the substrate 111D which has the antenna elements 112D provided on the top surface thereof, and all of the antenna elements 112D overlap the ground layer 113D in the plan view, the antenna elements 112D and the ground layer 113D form a patch antenna (or microstrip antenna).

Power is supplied to each antenna element 112D via a through hole and a wiring (or interconnect) of the substrate 111D. Gains and phases of radio waves radiated from the plurality of antenna elements 112D are adjusted to form a single beam.

The array antenna 110D is not limited to the configuration illustrated in FIG. 3, and may have a configuration different from that illustrated in FIG. 3, as long as the plurality of antenna elements 112D are arranged. For example, the plurality of antenna elements 112D may be arranged linearly, instead of being arranged in an array.

Figure 4A:
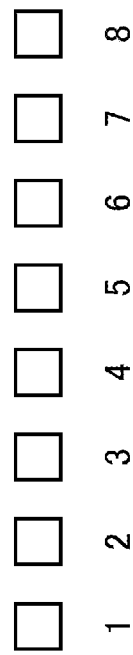
FIG. 4A, FIG. 4B, and FIG. 4C are diagrams for explaining a Chebyshev weighting.
Figure 4B:
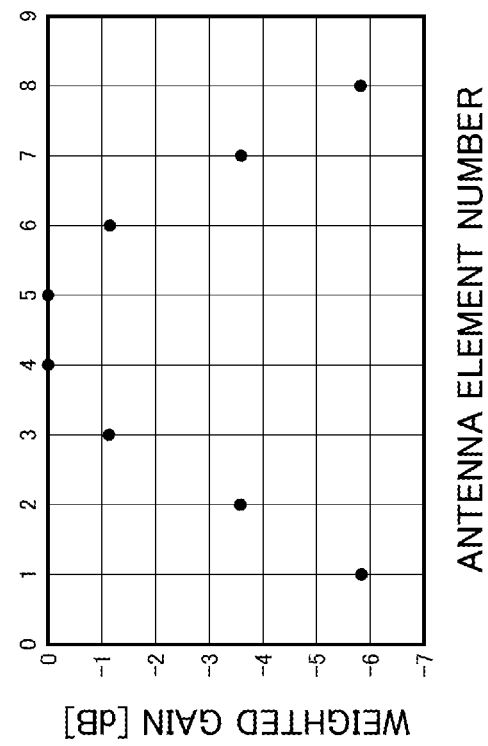
Figure 4C:
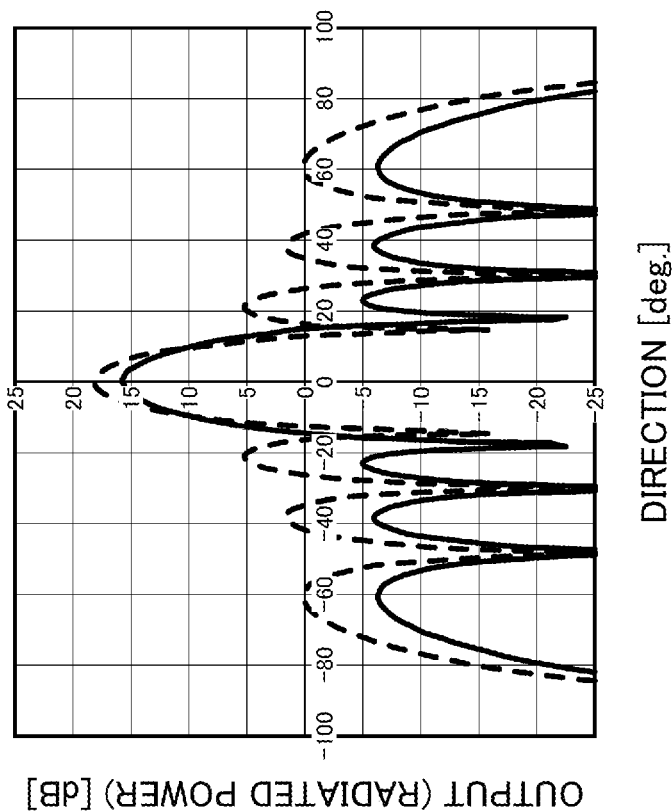

Next, a reduction of a side lobe by a Chebyshev weighting will be described, with reference to FIG. 4A, FIG. 4B, and FIG. 4C. FIG. 4A through FIG. 4C are diagrams for explaining the Chebyshev weighting. For the sake of convenience, it is assumed that 8 antenna elements are arranged linearly as illustrated in FIG. 4A, and antenna elements numbers 1 through 8 are allocated to the antenna elements from the leftmost antenna element to the rightmost antenna element in the linear arrangement. It is also assumed that 8 variable amplifiers are connected to the 8 antenna elements, respectively, and the gain is weighted when amplifying the power radiated from the 8 antenna elements.

In FIG. 4B, an abscissa indicates the antenna element number, and the ordinate indicates the weighted gain. The gain of the power radiated from the 8 antenna elements is weighted in steps, so that the gain given to the power radiated from the eight antenna elements is such that the gain of the power radiated from the antenna elements arranged at the ends of the linear arrangement and having the antenna element numbers 1 and 8 is the smallest, and the gain of the power radiated from the antenna elements arranged at the center of the linear arrangement and having the antenna element numbers 4 and 5 is the largest. Such a weighting is the Chebyshev weighting, and a difference in the weighting is small between the adjacent antenna elements.

FIG. 4C illustrates the output (radiated power) of a main lobe and a side lobe when the power is radiated from the 8 antenna elements of FIG. 4A without the weighting by a dashed line, and the output (radiated power) of the main lobe and the side lobe when the power is radiated from the 8 antenna elements of FIG. 4A with the weighting described above by a solid line. In both the cases without the weighting and with the weighting, one waveform having a largest output at the center represents the output of the main lobe, and three waveforms on both sides of the main lobe represent the output of the side lobe.

When the weighting is reduced from the center towards the ends of the linear arrangement of the 8 antenna elements, the output of the main lobe at the center indicated by the solid line is almost the same as the output of the main lobe at the center for the case without the weighting indicated by the dashed line, as illustrated by the solid line in FIG. 4C. However, the output of the side lobes for the case with the weighting indicated by the solid line is reduced compared to the output of the side lobes for the case without the weighting indicated by the dashed line. Hence, the Chebyshev weighting enables selective reduction of the output of the side lobes, while maintaining the output of the main lobe approximately the same as the output of the main lobe for the case without the Chebyshev weighting.

Figure 5:
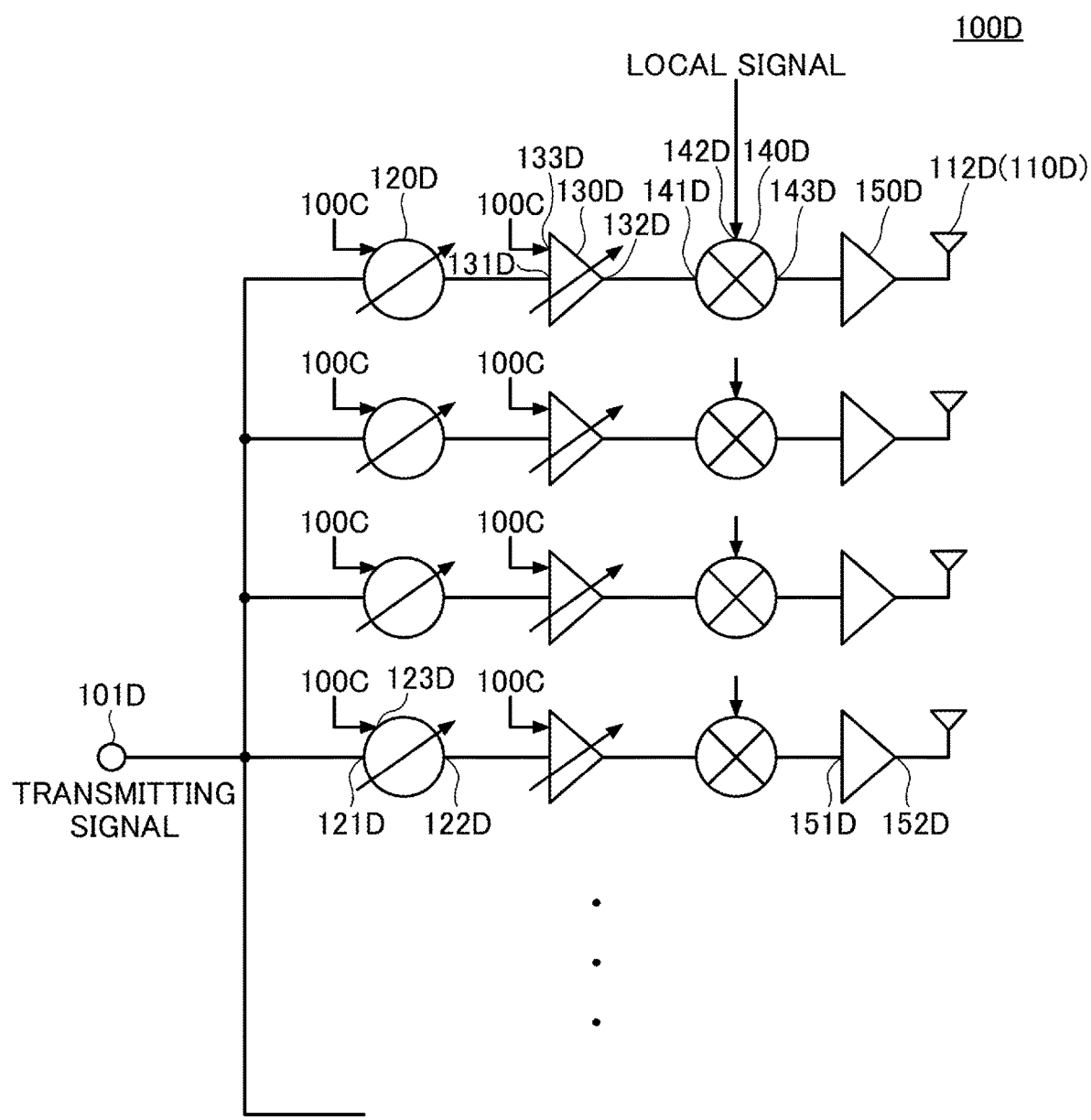
FIG. 5 is a diagram illustrating the beam output device.

FIG. 5 is a diagram illustrating the beam output device 100D. The beam output device 100D includes a signal terminal 101D, the array antenna 110D, a phase shifter 120D, an amplifier 130D, a mixer 140D, and a power amplifier (PA) 150D. The signal terminal 101D is connected to the signal output circuit 12 illustrated in FIG. 2, and is an example of an input terminal to which the transmitting signal is input.

FIG. 5 illustrates the antenna elements 112D of the array antenna 110D. Although there are 64 antenna elements 112D as illustrated in FIG. 3, FIG. 5 illustrates the configuration related to 4 of the 64 antenna elements 112D.

As an example, 4 phase shifters 120D, 4 amplifiers 130D, 4 mixers 140D, and 4 PAs 150D are connected to the 4 antenna elements 112D. Because the beam output device 100D includes 64 antenna elements 112D, the beam output device 100D includes 64 phase shifters 120D, 64 amplifiers 130D, 64 mixers 140D, and 64 PAs 150D.

The phase shifter 120D includes an input terminal 121D, an output terminal 122D, and a control terminal 123D. The output terminal 122D is connected to the input terminal 131D of the amplifier 130D. The control terminal 123D is connected to the controller 100C illustrated in FIG. 2, and the phase weighting data is input to the control terminal 123D. The phase shifter 120D shifts the phase of the transmitting signal input to the input terminal 121D, according to the phase weighting data input to the control terminal 123D, and outputs the phase-shifted transmitting signal from the output terminal 122D.

The amplifier 130D includes the input terminal 131D connected to the output terminal 122D, an output terminal 132D, and a control terminal 133D connected to the controller 100C illustrated in FIG. 2. The input terminal 131D receives the phase-shifted transmitting signal from the output terminal 122D. An input terminal 141D of the mixer 140D is connected to the output terminal 132D. A weight for the gain, received from the controller 100C, is input to the control terminal 133D.

The gain of the amplifier 130D is variably controlled according to the weight for the gain when amplifying the transmitting signal, and the amplifier 130D amplifies the transmitting signal input to the input terminal 131D. The amplifier 130D outputs the transmitting signal, input to the input terminal 131D, from the output terminal 132D after amplifying the transmitting signal. The weight is controlled by the controller 100C. The weight is included in the gain weighting data input to the controller 100C from the memory 100B. The gain of amplifier 130D, weighted by the weight, can be controlled in steps (variation width of the gain) of 1 dB in a range of −20 dB to 0 dB, for example.

The mixer 140D includes input terminals 141D and 142D, and an output terminal 143D. The input terminal 141D is connected to the output terminal 132D of the amplifier 130D, and the amplified transmitting signal from the amplifier 130D is input to the input terminal 141D. The input terminal 142D is connected to the signal output circuit 13 of the base station 10, and the local signal is input to the input terminal 142D. The output terminal 143D is connected to an input terminal 151D of the PA 150D. The mixer 140D multiplies the transmitting signal input to the input terminal 141D by the local signal input to the input terminal 142D, and outputs a multiplied signal from the output terminal 143D.

The PA 150D is a power amplifier including an input terminal 151D, and an output terminal 152D. The input terminal 151D is connected to the output terminal 143D of the mixer 140D, and the output terminal 152D is connected to the antenna element 112D. The PA 150D amplifies the signal input from mixer 140D, and outputs the amplified signal to the antenna element 112D. An amplification factor of PA 150D is constant.

The beam output device 100D having the configuration described above outputs the plurality of beams from the array antenna 110D, for example. Because each beam includes the main lobe and the side lobes, and has a unique beam identifier (ID), interference between the main lobe of each beam and the side lobes of other beams needs to be reduced. In order to reduce the interference between the beams, the gain of the signal emitted from each antenna element 112D needs to be adjusted. The gain of the signal emitted from each antenna element 112D can be adjusted by the amplifier 130D.

Figure 6:
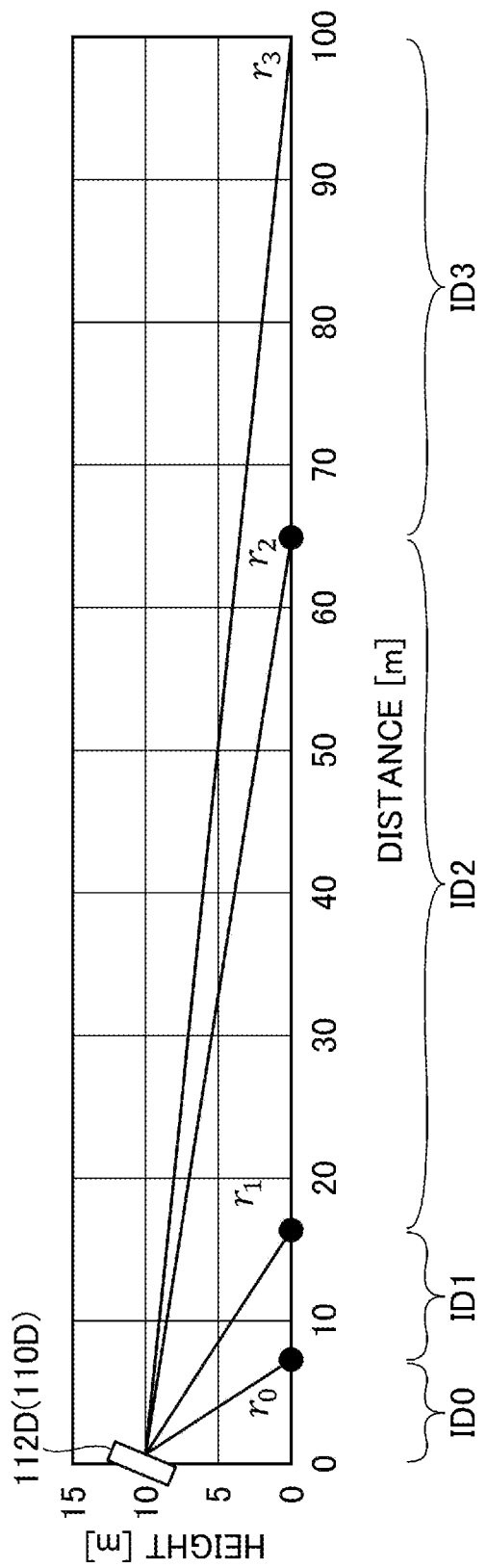
FIG. 6 is a diagram for explaining a range reachable by a main lobe of a beam output from the array antenna.

FIG. 6 is a diagram for explaining a range reachable by the main lobe of the beam output from the array antenna 110D. The range reachable by the main lobe of the beam is a range in which the terminals 30A and 30B illustrated in FIG. 1A and FIG. 1B can receive power greater than or equal to a predetermined power enabling the data communication.

For example, it is assumed that the array antenna 110D outputs 4 beams. It is also assumed that beam identifiers (IDs) ID0 through ID3 are assigned to the 4 beams. As an example, the array antenna 110D may be located at a height position which is 10 meters above the ground level.

The range reached by the main lobe differs for each of the 4 beams. The beam having the beam ID ID0 reaches a range with a distance $r_0$ from the array antenna 110D, the beam having the beam ID ID1 reaches a range with a distance $r_0$ to $r_1$ from the array antenna 110D. The beam having the beam ID ID2 reaches a range with a distance $r_1$ to $r_2$ from the array antenna 110D, and the beam having the beam ID ID3 reaches a range with a distance $r_2$ to $r_3$ from the array antenna 110D. It is assumed that the distance $r_3$ is a maximum distance reachable by the beam, at a maximum power $P_A$ outputtable by the beam which is output by the beam forming of the array antenna 110D.

FIG. 7 is a diagram illustrating data relating the beam ID, the distance, and a power constraint of the main lobe. The distance is the maximum distance reachable by each beam. The power constraint of the main lobe represents the output of the beam having each beam ID using the maximum power $P_A$ outputtable by the beam which is output by the beam forming of the array antenna 110D.

As illustrated in FIG. 7, with respect to the beam having the beam ID ID0, the distance is $r_0$, and the power constraint is a ratio of $r_0^2$ to $r_3^2$ multiplied by the maximum power $P_A$. With respect to the beam having the beam ID ID1, the distance is $r_1$, and the power constraint is a ratio of $r_1^2$ to $r_3^2$ multiplied by the maximum power $P_A$. With respect to the beam having the beam ID ID2, the distance is $r_2$, and the power constraint is a ratio of $r_2^2$ to $r_3^2$ multiplied by the maximum power $P_A$. With respect to the beam having the beam ID ID3, the distance is $r_3$, and the power constraint is the maximum power $P_A$. Although the example described hereinafter expresses the power constraint using the ratio of the squares of the distances, the power constraint may be expressed using a ratio of cubes of the distances.

Figure 8:
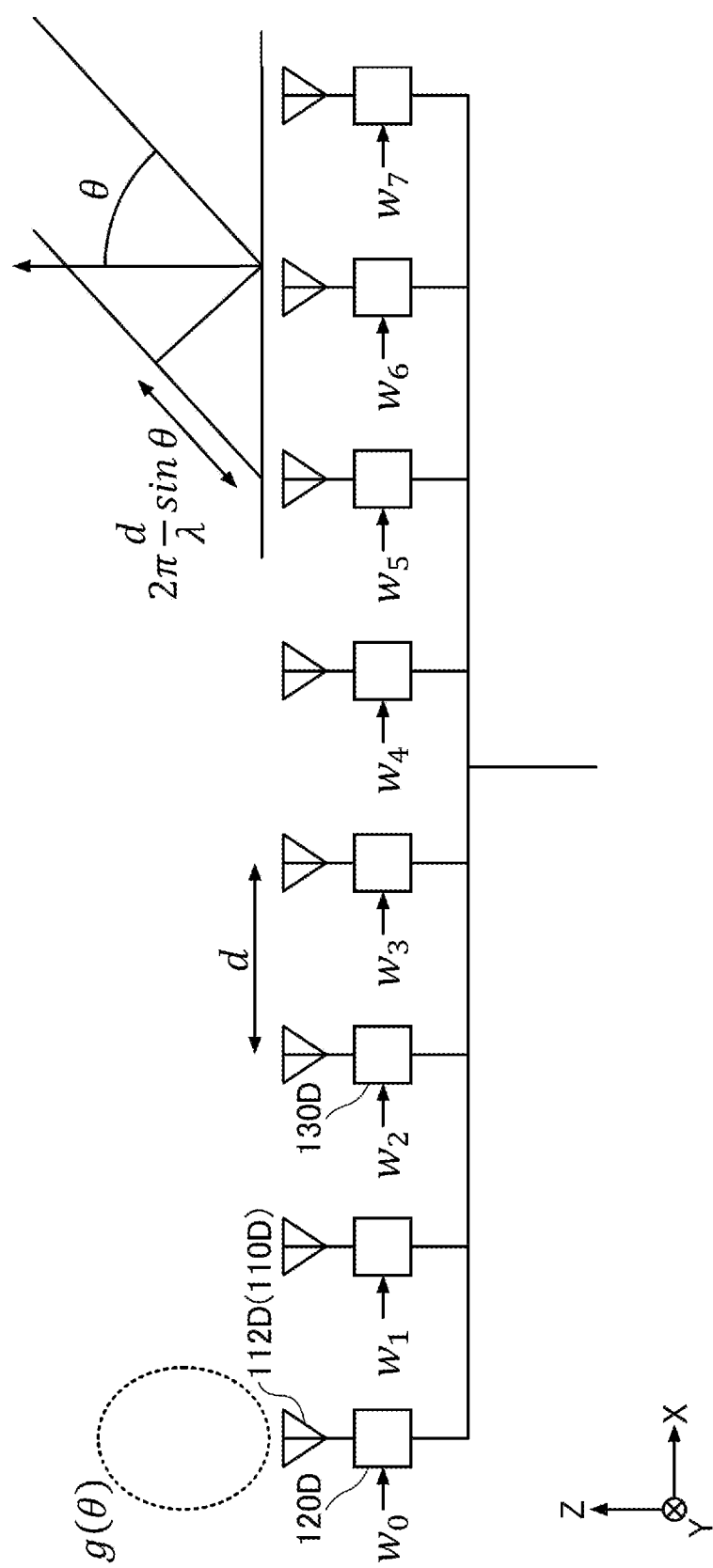
FIG. 8 is a diagram for explaining a radiation pattern and a phase error in the array antenna.

FIG. 8 is a diagram for explaining a radiation pattern and a phase error in the array antenna 110D. FIG. 8 illustrates, as an example, 8 of the 64 antenna elements 112 illustrated in FIG. 3. The 8 antenna elements 112 illustrated in FIG. 8 are the 8 antenna elements 112 included in 1 row of the 8 rows of antenna elements 112 arranged in the Y direction, and are the 8 antenna elements 112 arranged in the X direction. In FIG. 8, a combination of the phase shifter 120D and the amplifier 130D is illustrated by a single block, and it is assumed for the sake of convenience that weighting coefficients $w_0$ through $w_7$ of the weighting data are input to each of such 8 blocks, respectively.

As illustrated for the antenna element 112 at the end along the −X direction, a radiation pattern of the power output (radiated) from the antenna element 112 is denoted by $g(\theta)$. As illustrated for the second antenna element 112 from the end along the +X direction, an angle $\theta$ denotes an angle with respect to a straight line (normal through a center of the antenna element 112) parallel to the Z axis passing through the center of the antenna element 112 in the plan view.

If a distance along the X direction, between adjacent antenna elements 112 which are adjacent to each other in the X direction, is denoted by d (mm), a phase error of the radio waves radiated from the adjacent antenna elements 112 which are adjacent to each other in the X direction, in the direction of the angle $\theta$, is $2\pi(d/\lambda)\sin\theta$, where $\lambda$ denotes a free space wavelength of the radio wave output from each antenna element 112.

Next, a method of generating the phase weighting data and the gain weighting data, applied to the beam output from the array antenna 110D by the controller 100C, will be described. An example will be described where the array antenna 110D outputs 3 beams. A first beam of the 3 beams may be the beam 50A illustrated in FIG. 1A which is an example of a first beam. Each of a second beam and a third beam of the 3 beams has a main lobe which interferes with at least one of the plurality of side lobes 52A of the beam 50A, such as the beam 50B illustrated in FIG. 1B. Next, these 3 beams will be described distinguishably as the first beam (#1), the second beam (#2), and the third beam (#3).

Next, the weighting data representing the phase and the gain input to the phase shifter 120D and the amplifier 130D corresponding to the 64 antenna element 112 will be expressed by a weighting vector w. The weighting vector w may be expressed by the following formula (1) including 64 weighting coefficients $w_0$ through $w_{N-1}$, where N denotes is an integer greater than or equal to 2 and representing the number of antenna elements 112. In this example, N=64.

$$w = \begin{pmatrix} w_0 \\ \vdots \\ w_{N-1} \end{pmatrix} \quad (1)$$

A matrix representing the output power of the main lobe of the first beam (#1) is denoted by A. The matrix A is an example of a first matrix. A matrix representing the output power of the side lobe, among the plurality of side lobes of the first beam (#1), interfering with the main lobe of the second beam (#2) and third beam (#3), is denoted by B. The matrix B is an example of a second matrix.

A power $P_S$ of the main lobe of the first beam (#1) may be represented by the following formula (2). In the formula (2), N denotes the number of pairs of the phase shifter 120D and the amplifier 130D. If there are 64 phase shifters 120D and 64 amplifiers 130D, N=64. n denotes the number assigned to the pair of the phase shifter 120D and the amplifier 130D. n is a number from 0 to N−1, and a total number of the numbers assigned by n is N.

$$P_S = \int_{\theta \in ID\#1} \left| \sum_{n=0}^{N-1} w_n g(\theta) e^{-j2\pi \frac{d}{\lambda} n \sin\theta} \right|^2 d\theta = w^H A w \quad (2)$$

A power $P_I$ of the side lobe, among the plurality of side lobes of the first beam (#1), which interferes with the main lobes of the second beam (#2) and the third beam (#3), may be expressed by the following formula (3).

$$P_I = \int_{\theta \in ID\#2,\#3} \left| \sum_{n=0}^{N-1} w_n g(\theta) e^{-j2\pi \frac{d}{\lambda} n \sin\theta} \right|^2 d\theta = w^H B w \quad (3)$$

In the formula (3), a vector $w^H$ indicated by bold symbols denotes a complex conjugate transpose of the weighting vector w. As indicated by the following formula (4), a sum of the squares of the weighting coefficients $w_0$ to $w_{N-1}$ included in the weighting vector w is assumed to be a constant C. The formula (4) expresses a constraint for the weighting vector w. The sum of the squares of the weighting coefficients $w_0$ to $w_{N-1}$ may be obtained by multiplying the vector w by the vector $w^H$. Because the sum of the squares of the weighting coefficients $w_0$ to $w_{N-1}$ is equal to a sum of the power radiated in all directions, the sum of the squares of the weighting coefficients $w_0$ to $w_{N-1}$ is set to the constant C in order to keep the power radiated in all directions constant.

$$C = \sum_{n=0}^{N-1} |w_n|^2 = w^H w \quad (4)$$

If an eigen vector corresponding to a maximum eigen value of the matrix A is denoted by a weighting vector $w_A$, the maximum power $P_A$ may be represented the following formula (5).

$$P_A = w_A^H A w_A \quad (5)$$

In addition, if an eigen vector corresponding to a maximum eigen value of a matrix (A−βB), which is obtained by subtracting from the matrix A matrix βB obtained by multiplying a reduction ratio β to the matrix B, is denoted by a weighting vector w, $SIR_{max}$ representing a ratio of the output power of the main lobe with respect to the output power of the side lobes interfering with the main lobes of the second beam (#2) and the third beam (#3) beams, for the first beam (#1) having the side lobes interfering with the main lobes of the second beam (#2) and the third beam (#3), may be represented by the following formula (6).

$$SIR_{max} = \frac{w_w^H A w_w}{w_w^H B w_w} \quad (6)$$

When the weighting vector w is obtained utilizing Lagrange's method of undetermined coefficients, the following formula (7) may be obtained, where β denotes a reduction ratio for reducing the output power B of the side lobes of the first beam (#1) interfering with the main lobes of the second beam (#2) and the third beam (#3).

$$h(w,\xi) = P_S - \beta P_I - \xi(w^H w - C) = w^H(A - \beta B)w - \xi(w^H w - C) \quad (7)$$

When the formula (7) is used as an evaluation function, and the formula (7) is subjected to a partial differentiation by the weighting vector w, the following formula (8) may be obtained.

$$\frac{\partial h(w, \xi)}{\partial w} = (A - \beta B)w - \xi w = 0 \quad (8)$$

From the formula (8), ξ becomes a maximum eigen value of the matrix (A−βB) which is obtained by subtracting, from the matrix A, the matrix βB obtained by multiplying the reduction ratio β to the matrix B, and the eigen vector corresponding to this maximum eigen value ξ becomes the weighting vector w. The eigen vector corresponding to the maximum eigen value ξ of the matrix (A−βB), is obtained from the following formula (9) as the weighting vector w. This weighting vector w is the weighting vector which is to be ultimately obtained by the wireless communication device 100 and the beam control method according to this embodiment.

$$\frac{\partial h(w, \xi)}{\partial \xi} = w^H w - C = 0 \quad (9)$$

Figure 9:
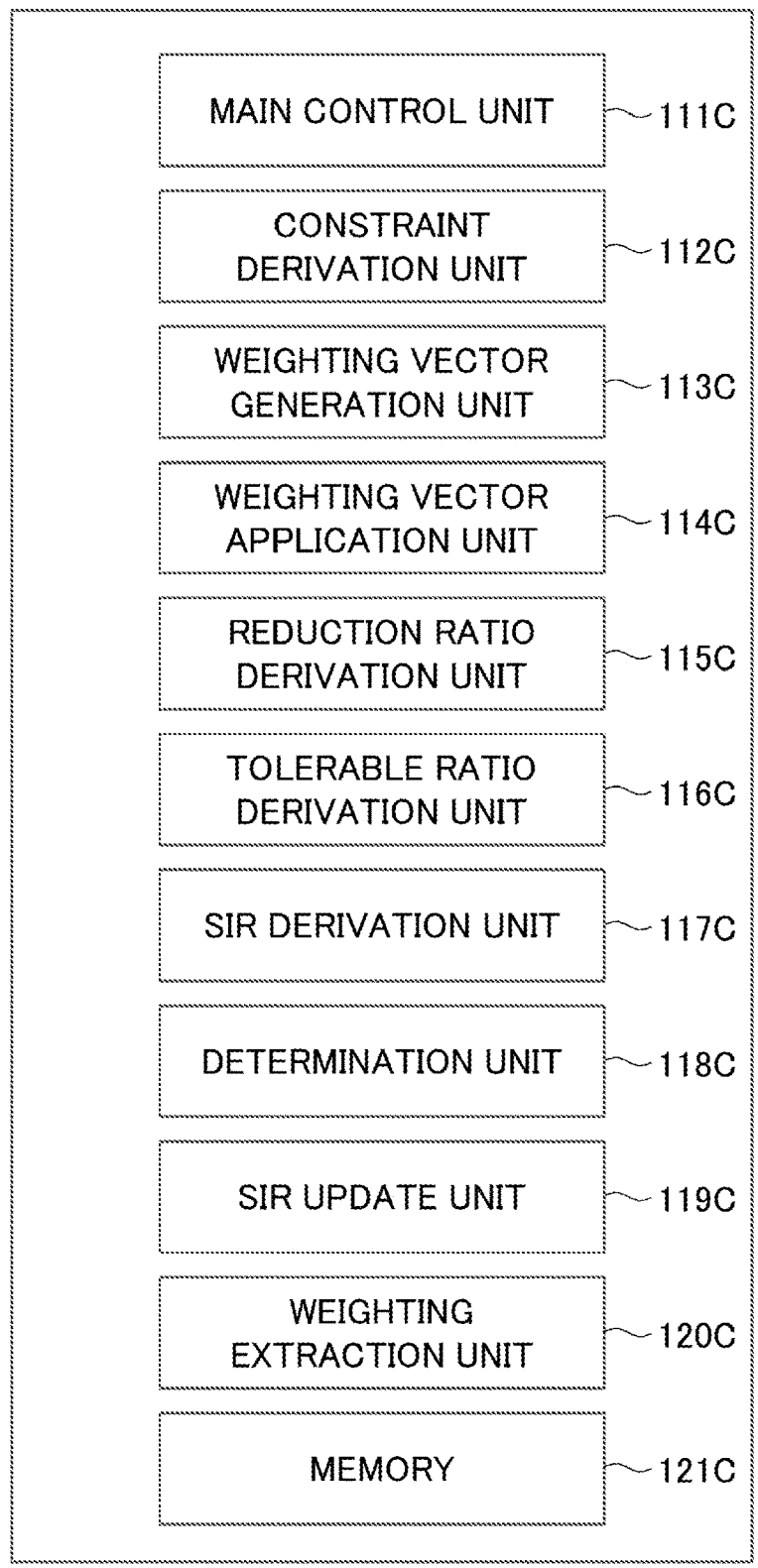
FIG. 9 is a diagram illustrating a configuration of a controller.

FIG. 9 is a diagram illustrating a configuration of the controller 100C. The controller 100C includes a main control unit 111C, a constraint derivation unit 112C, a weighting vector generation unit 113C, a weighting vector application unit 114C, a reduction ratio derivation unit 115C, a tolerable ratio derivation unit 116C, an SIR derivation unit 117C, a determination unit 118C, an SIR update unit 119C, a weighting extraction unit 120C, and a memory 121C. The controller 100C may be implemented by a computer including a Central Processing Unit (CPU), a Random Access Memory (RAM), a Read Only Memory (ROM), a Hard Disk Drive (HDD), an input and output (I/O) interface, an internal bus, or the like.

The main control unit 111C, the constraint derivation unit 112C, the weighting vector generation unit 113C, the weighting vector application unit 114C, the reduction ratio derivation unit 115C, the tolerable ratio derivation unit 116C, the SIR derivation unit 117C, the determination unit 118C, the SIR update unit 119C, and the weighting extraction unit 120C represent functions of functional blocks performed by one or more programs executed by the controller 100C. In addition, the memory 121C represents functions of the memory of the controller 100C.

The main control unit 111C may be a processing unit which supervises a control process of the controller 100C. The main control unit 111C performs processes other than the processes performed by the constraint derivation unit 112C, the weighting vector generation unit 113C, the weighting vector application unit 114C, the reduction ratio derivation unit 115C, the tolerable ratio derivation unit 116C, the SIR derivation unit 117C, the determination unit 118C, the SIR update unit 119C, and the weighting extraction unit 120C.

The constraint derivation unit 112C is an example of a maximum power computation unit, and computes the maximum power $P_A$. The constraint derivation unit 112C derives the constraint for the beam having each beam ID using the maximum power $P_A$ and the distance described with reference to FIG. 6, and creates the data illustrated in FIG. 7. The constraint derivation unit 112C may acquire a preset power value of the maximum power $P_A$ from the memory 121C. The constraint derivation unit 112C may acquire a distance, associated with (or related to) the data representing a receivable region of the radio wave allocated in advance with respect to each beam ID, from the memory 121C.

The weighting vector generation unit 113C is an example of a weighting vector derivation unit which derives the weighting vector w corresponding to the maximum eigen value of the matrix (A−βB). The matrix (A−βB) is obtained by subtracting, from the matrix A representing the output power of the main lobe 51A of the beam 50A, the matrix βB which is obtained by multiplying the reduction ratio β for reducing the output power of the side lobe 52B of the beam 50A interfering with the side lobe 51B of the beam 50B, to the matrix B representing the output power of the side lobe 52A of the beam 50A.

More particularly, the weighting vector generation unit 113C computes an initial value of the weighting vector w corresponding to the maximum eigen value of the matrix (A−βB) which is obtained by subtracting, from the matrix A, the matrix βB obtained by multiplying the reduction ratio β to the matrix B.

In addition, the weighting vector generation unit 113C performs a second process for generating a weighting vector $w_w$ corresponding to the maximum eigen value of the matrix (A−βB) which is obtained by subtracting, from the matrix A representing the output power of the main lobe of the first beam (#1), the matrix βB obtained by multiplying an increased reduction ratio β which is increased by a predetermined ratio by the reduction ratio derivation unit 115C, to the matrix B.

Further, the weighting vector generation unit 113C stores the weighting vector w before obtaining the weighting vector $w_w$ by the second process, in the memory 121C, as a weighting vector $w_c$.

The weighting vector application unit 114C outputs the phase weighting data to the phase shifter 120D illustrated in FIG. 5, and outputs the gain weighting data to the amplifier 130D illustrated in FIG. 5. Hence, the weighting vector application unit 114C applies the weighting of the phase and the weighting of the gain to the beams 50A and 50B output from the array antenna 110D. The weighting vector application unit 114C outputs the weighting vector extracted by the weighting extraction unit 120C. The weighting vector w is the weighting data and represents the phase and the gain.

The reduction ratio derivation unit 115C derives an initial value of the reduction ratio β, and the increased reduction ratio β which is increased by the predetermined ratio. A process of deriving the increased reduction ratio β which is increased by the predetermined ratio is an example of a first process performed by the reduction ratio derivation unit 115C. The reduction ratio derivation unit 115C may repeat the process of increasing the reduction ratio β by the predetermined ratio, in a flow chart which will be described later.

The tolerable ratio derivation unit 116C derives a tolerable ratio α representing a ratio with which the reduction is tolerated when reducing the maximum power $P_A$. When the maximum power $P_A$ is reduced, the SIR has a tendency to increase because the output of the side lobe decreases. For this reason, in the process of maximizing the SIR, the tolerable ratio derivation unit 116C decreases the tolerable ratio α with which the reduction of the maximum power $P_A$ is tolerated. However, when the tolerable ratio α decreases, the output power of the main lobe decreases, and the receivable region of the beam having the beam ID with a long radio wave radiating distance decreases. Hence, a lower limit of the tolerable ratio α is provided. The tolerable ratio α is preferably greater than 0 and less than 1.

The SIR derivation unit 117C computes, as a maximum $SIR_{max}$, a power ratio of an initial value of the output power of the main lobe of the first beam (#1), obtained by multiplying the initial value of the weighting vector w and the complex conjugate transpose $w^H$ of the initial value of the weighting vector w to the matrix A, with respect to an initial value of the output power of the side lobe of the first beam (#1), obtained by multiplying the initial value of the weighting vector w and the complex conjugate transpose $w^H$ of the initial value of the weighting vector w to the matrix B, based on the formula (6), using the weighting vector w generated by the weighting vector generation unit 113C. The SIR represents the power ratio of the signal power with respect to the interference power.

The determination unit 118C determines whether or not the output power $w^H Aw$ of the main lobe of the first beam (#1), obtained by multiplying the weighting vector w and the complex conjugate transpose $w^H$ of the weighting vector w to the matrix A, is greater than the power $αP_A$ obtained by multiplying the tolerable ratio α to the maximum power $P_A$. In addition, when the determination unit 118C determines that the output power $w^H Aw$ of the main lobe of the first beam (#1) is greater than the power $αP_A$, the determination unit 118C further performs the following determination. The following determination is an example of a third process performed by the determination unit 118C. In other words, the determination unit 118C determines whether or not the SIR, which is the power ratio of the output power of the main lobe of the first beam (#1), obtained by multiplying the weighting vector $w_w$ and the complex conjugate transpose $w_w^H$ of the vector $w_w$ to the matrix A, with respect to the output power of the side lobe of the first beam (#1), obtained by multiplying the weighting vector $w_w$ and the complex conjugate transpose $w_w^H$ of the vector $w_w$ to the matrix B, is greater than the maximum $SIR_{max}$. The weighting vector $w_w$ is the weighting vector obtained by using the increased reduction ratio β after the reduction ratio β is increased by the predetermined ratio by the reduction ratio derivation unit 115C.

When the determination unit 118C determines that the SIR, which is the power ratio of the output power of the main lobe of the first beam (#1), obtained by multiplying the weighting vector $w_w$ and the complex conjugate transpose $w_w^H$ of the vector $w_w$ to the matrix A, with respect to the output power of the side lobe of the first beam (#1), obtained by multiplying the weighting vector $w_w$ and the complex conjugate transpose $w_w^H$ of the vector $w_w$ to the matrix B, is greater than the maximum $SIR_{max}$, the SIR update unit 119C updates the maximum $SIR_{max}$ to the SIR that is determined to be greater than the maximum $SIR_{max}$.

On the other hand, when the determination unit 118C determines that the SIR, which is the power ratio of the output power of the main lobe of the first beam (#1), obtained by multiplying the weighting vector $w_w$ and the complex conjugate transpose $w_w^H$ of the vector $w_w$ to the matrix A, with respect to the output power of the side lobe of the first beam (#1), obtained by multiplying the weighting vector $w_w$ and the complex conjugate transpose $w_w^H$ of the vector $w_w$ to the matrix B, is less than or equal to (that is, not greater than) the maximum $SIR_{max}$, the weighting extraction unit 120C extracts the weighting vector $w_c$ stored in the memory 121C. The weighting vector $w_c$ extracted by the weighting extraction unit 120C is a weighting vector that is finally obtained.

The memory 121C stores one or more programs and data required to perform the processes described above.

Figure 10:
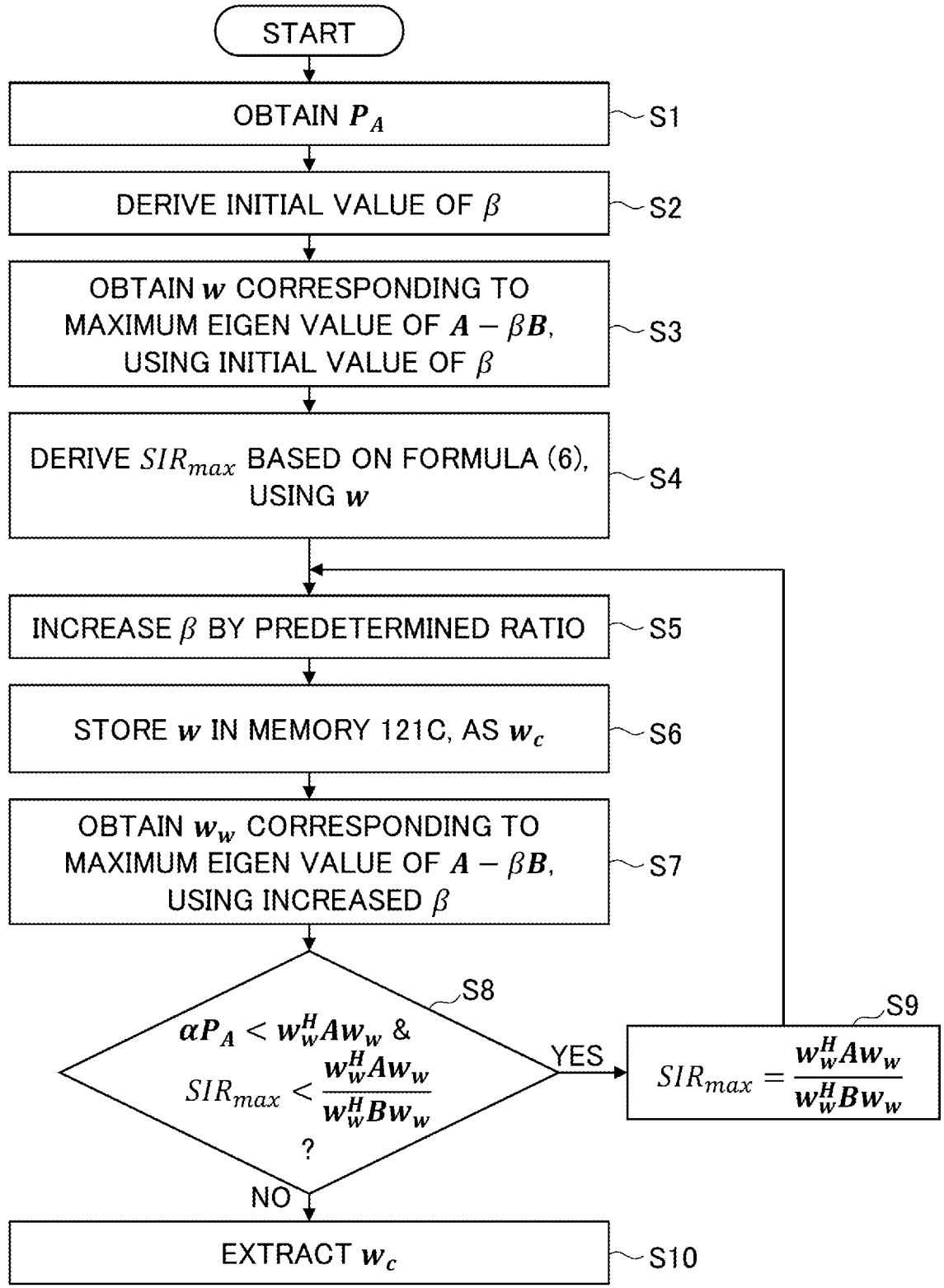
FIG. 10 is a flow chart illustrating a process executed by the control device.

FIG. 10 is a flow chart illustrating the process performed by the controller 100C. When the controller 100C starts the process, the constraint derivation unit 112C derives the maximum power $P_A$ according to the formula (5), in step S1.

The reduction ratio derivation unit 115C derives the initial value of the reduction ratio β, in step S2. The initial value of the reduction ratio β may be stored in the memory 121C, and read out from the memory 121C by the reduction ratio derivation unit 115C. The initial value of the reduction ratio β may be determined in advance to an appropriate value, according to results of experiments or the like, for example.

The weighting vector generation unit 113C generates the weighting vector w corresponding to the maximum eigen value of the matrix (A−βB) by subtracting, from the matrix A representing the output power of the main lobe 51A of the beam 50A, the matrix βB which is obtained by multiplying the initial value of the reduction ratio β to the matrix B representing the output power of the side lobe 52A of the beam 50A, in step S3.

The SIR derivation unit 117C derives, as the maximum $SIR_{max}$, the power ratio of the initial value of the output power of the main lobe of the first beam (#1), obtained by multiplying the initial value of the weighting vector w and the complex conjugate transpose $w^H$ of the initial value of the weighting vector w to the matrix A, with respect to the initial value of the output power of the side lobe of the first beam (#1), obtained by multiplying the initial value of the weighting vector w and the complex conjugate transpose $w^H$ of the initial value of the weighting vector w to the matrix B, based on the formula (6), using the weighting vector w generated in step S3 by the weighting vector generation unit 113C, in step S4.

The reduction ratio derivation unit 115C derives the increased reduction ratio β which is increased by the predetermined ratio, in step S5. The process of step S5 is the first process performed by the reduction ratio derivation unit 115C. The reduction ratio β may be increased by the predetermined ratio by adding a predetermined value to the reduction ratio β, multiplying a constant to the reduction ratio β, or the like, for example.

The weighting vector generation unit 113C stores the weighting vector w in the memory 121C, as the weighting vector $w_c$, in step S6. In other words, the weighting vector generation unit 113C stores the weighting vector w before obtaining the weighting vector $w_w$ by the second process, in the memory 121C, as the weighting vector $w_c$.

The weighting vector generation unit 113C generates the weighting vector $w_w$ corresponding to the maximum eigen value of the matrix (A−βB) which is obtained by subtracting, from the matrix A representing the output power of the main lobe of the first beam (#1), the matrix βB obtained by multiplying the increased reduction ratio β which is increased by the predetermined ratio in step S5 by the reduction ratio derivation unit 115C, to the matrix B, in step S7. The process of step S7 is the second process performed by the weighting vector generation unit 113C.

The determination unit 118C performs the following first and second determinations, in step S8. In the first determination, the determination unit 118C determines whether or not the output power $w_w^H A w_w$ of the main lobe of the first beam (#1), obtained by multiplying the weighting vector $w_w$ and the complex conjugate transpose $w_w^H$ of the weighting vector $w_w$ to the matrix A, is greater than the power $\alpha P_A$ obtained by multiplying the tolerable ratio α to the maximum power $P_A A$. In addition, the second determination is performed when the determination unit 118C determines that the output power $w_w^H A w_w$ of the main lobe of the first beam (#1) is greater than the power $\alpha P_A$. In the second determination, the determination unit 118C determines whether or not the SIR, which is the power ratio of the output power of the main lobe of the first beam (#1), obtained by multiplying the weighting vector $w_w$ and the complex conjugate transpose $w_w^H$ of the vector $w_w$ to the matrix A, with respect to the output power of the side lobe of the first beam (#1), obtained by multiplying the weighting vector $w_w$ and the complex conjugate transpose $w_w^H$ of the vector $w_w$ to the matrix B, is greater than the maximum $SIR_{max}$.

When the determination unit 118C determines that the first and second determinations in step S8 are true (that is, a decision result in step S8 is YES), the SIR update unit 119C updates the maximum $SIR_{max}$ to the power ratio that is determined in step S8 to be greater than the maximum $SIR_{max}$, in step S9. After the process of step S9 ends, the process of the flow chart returns to step S5.

Further, when the processes of step S5 through S8 are performed and the determination unit 118C determines that the output power $w_w^H A w_w$ is greater than the power $\alpha P_A$ but the power ratio is not greater than the maximum $SIR_{max}$ (that is, the decision result in step S8 is NO), the weighting extraction unit 120C extracts the weighting vector $w_c$ stored in the memory 121C in step S10, as the weighting vector which is to be ultimately obtained. The decision result in step S8 may become NO after performing the process of each of steps S5 through S8 once. However, in this example, the value of the maximum $SIR_{max}$ is updated in step S9, while repeating the processes of steps S5 through S8, so as to optimize the weighting vector $w_c$ that is ultimately obtained. In other words, an optimum value of the weighting vector $w_c$ can be obtained.

Moreover, even when the determination unit 118C determines in step S8 that the output power $w_w^H A w_w$ is greater than the power $\alpha P_A$, the weighting extraction unit 120C extracts the weighting vector $w_c$ stored in the memory 121C in step S10, as the weighting vector which is to be ultimately obtained. If the first determination ($\alpha P_A < w_w^H A w_w$) in step S8 is false (not true), the main lobe has become too small, and thus, the weighting vector $w_c$ before the computation using the reduction ratio β in this state becomes the optimized weighting vector $w_c$ which is to be ultimately obtained. When the reduction ratio β is increased, the SIR increases because the effect of reducing the interference increases, and the main lobe has a tendency to decrease. For this reason, if the first determination ($\alpha P_A < w_w^H A w_w$) in step S8 is false, this indicates that the reduction ratio β has become too large, and the weighting vector $w_c$ obtained before then becomes the optimum value.

FIG. 11 is a diagram illustrating a beam distribution. Simulation results will be described for an example in which 16 antenna elements 112 are linearly arranged and the beam forming is performed. In FIG. 11, the abscissa indicates a direction, and the ordinate indicates a relative power (dB). FIG. 11 illustrates the beam distribution of the embodiment by a solid line, a signal maximum by a two-dot chain line, and an SIR maximum by a dashed line. The signal maximum is a beam distribution that is obtained when the reduction ratio β is set to zero (β=0), and the SIR maximum is a beam distribution that is obtained when the output power of the beam is reduced to obtain the maximum value of the SIR. The beam distribution of the embodiment is the beam distribution that is obtained when the reduction ratio β is optimized while making the tolerable ratio α as large as possible, according to the flow chart illustrated in FIG. 10. The dotted lines of 0 dB from −90 degrees to −40 degrees, −70 dB from −40 degrees to −30 degrees, 0 dB from −30 degrees to −20 degrees, 30 dB from −20 degrees to −5 degrees, 0 dB from −5 degrees to 0 degree, −70 dB from 0 degree to 40 degrees, and 0 dB from 40 degrees to 90 degrees, indicate regions (−40 degrees to −30 degrees, and from 0 degree to 40 degrees) where unwanted radiation of the side lobe is reduced, and a region (−20 degrees to −5 degrees) of the main lobe.

In the beam distribution of each of the signal maximum and the SIR maximum in the embodiment illustrated in FIG. 11, the main lobe is present in a section along the directions of approximately −20 degrees to approximately 0 degree, and the plurality of side lobes are present along other directions.

As illustrated in FIG. 11, the relative power of the main lobe of the embodiment decreases slightly compared to the relative power of the main lobe of the signal maximum, but is approximately 20 dB which is virtually the same level as that of the signal maximum. The relative power of the main lobe of the SIR maximum is approximately 2 dB, and considerably lower than those of the embodiment and the signal maximum.

In addition, the relative power of the side lobe of the embodiment is approximately −20 dB to approximately −15 dB, and considerably reduced compared to the relative power of the side lobe of the signal maximum, which is approximately −10 dB to approximately 0 dB). The relative power of the side lobe of the SIR maximum is approximately −63 dB to approximately −55 dB, and the relative power of the side lobe of the embodiment is at a sufficiently low level compared to that of the SIR maximum.

Figure 12B:
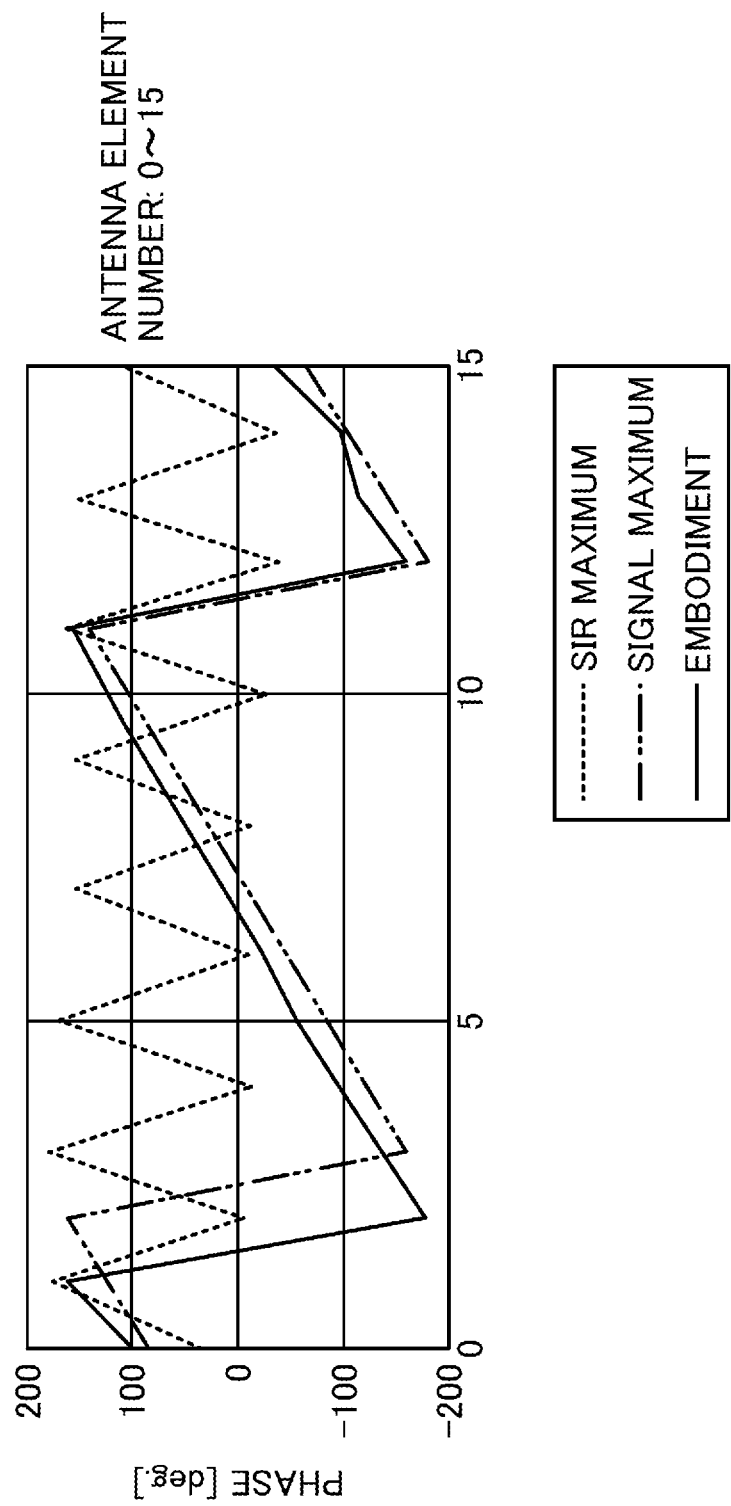

FIG. 12A and FIG. 12B are diagrams illustrating the output and the phase of each antenna element. FIG. 12A illustrates the amplitude (dB) of the output, and FIG. 12B illustrates the phase (deg.) of the output. Similar to FIG. 11, the simulation results will be described for an example in which 16 antenna elements 112 are linearly arranged and the beam forming is performed. The antenna element numbers 0 through 15 are assigned to the antenna elements 112, from one end of the linear arrangement.

As illustrated in FIG. 12A, among the outputs of the 16 antenna elements 112 in the case of the SIR maximum, it was found that the outputs of the antenna elements 112 located at both ends and having the antenna element numbers 0 through 4 and 11 through 15 decrease significantly compared to the outputs of the antenna elements 112 located at the center and having the antenna element numbers 5 to 10. It was also found that the outputs of the 16 antenna elements 112 in the case of the embodiment exhibit a similar tendency to the outputs of the 16 antenna elements 112 in the case of the signal maximum, and that although the outputs of the antenna elements 112 located at both ends and having the antenna element numbers 0 through 4 and 11 through 15 decrease, this decrease is not significant as in the case of the SIR maximum.

Moreover, as illustrated in FIG. 12B, it was found that the phases of the outputs of the 16 antenna elements 112 in the case of the embodiment exhibit a similar tendency as the phases of the outputs in the case of the signal maximum, and change periodically. Further, in the case of the SIR maximum, the phases changed considerably between the adjacent antenna elements 112. From the results of FIG. 12A and FIG. 12B, it was found that in the case of the embodiment, the output, in the direction in which the side lobe whose output is desirably reduced, can be reduced. In order to increase the main lobe of the embodiment, the amplitude and the phase are adjusted so as to reduce the output of the side lobe whose output is desirably reduced, under the constraint to maintain the same phase as in the case of the signal maximum. On the other hand, in the case of the SIR maximum, the amplitude and the phase are adjusted so as to reduce the output of the side lobe whose output is desirably reduced, without the phase constraint to increase the main lobe. For this reason, the results illustrated in FIG. 12B were obtained.

Figure 13:
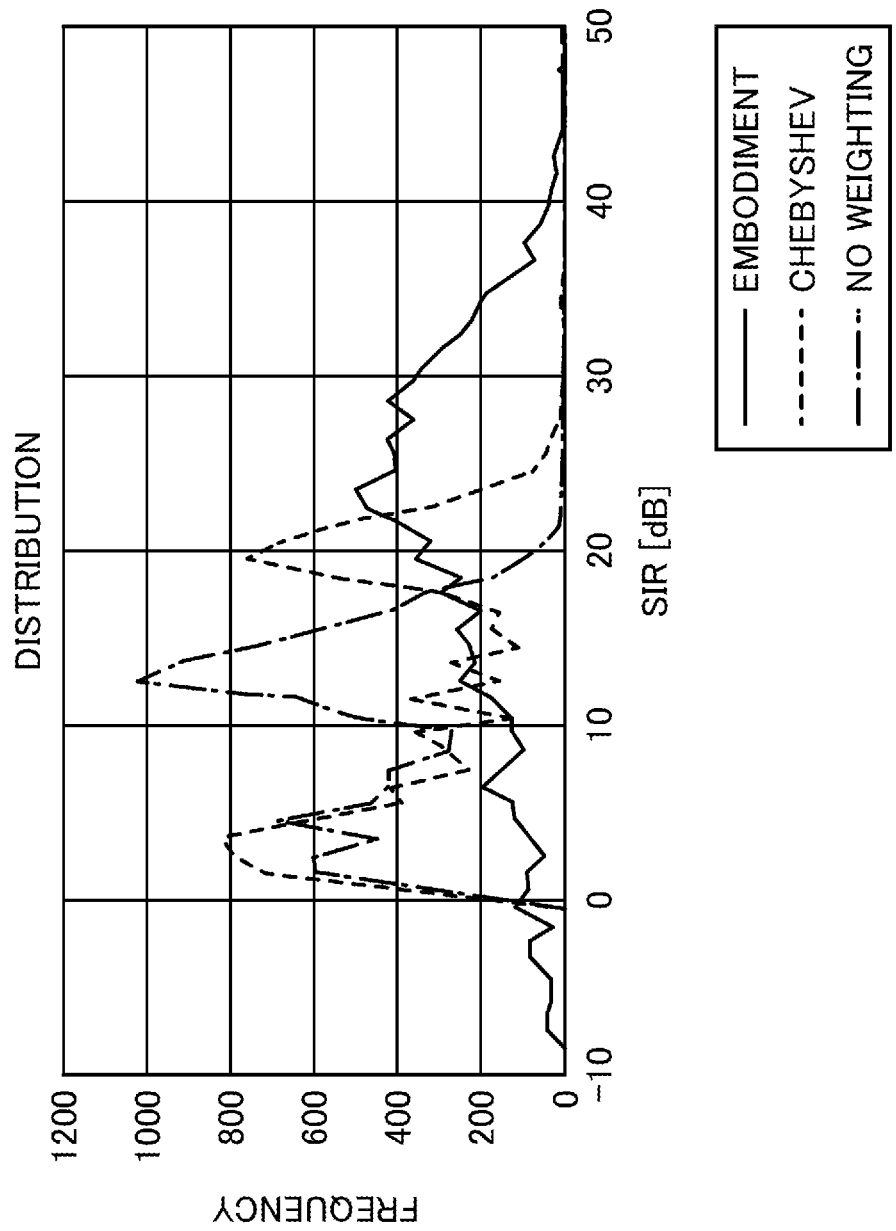
FIG. 13 is a diagram illustrating an SIR frequency distribution.

FIG. 13 is a diagram illustrating an SIR frequency distribution. The SIR frequency distribution illustrated in FIG. 13 was obtained in a state where the base station communicates with 4 terminals simultaneously. The SIR frequency distribution represents a distribution of the number of SIRs having the same value. Because the SIR is related to a throughput, the larger the SIR is, the higher the throughput becomes, and in the case of the fifth generation mobile communication system (5G), for example, the communication can be made at 1 Gbps or the like. When the SIR is small, the throughput becomes low, and thus, the communication can only be made at approximately several Mbps, for example.

In FIG. 13, the simulation results will be described for an example in which 8 antenna elements 112 are linearly arranged and the beam forming is performed. FIG. 13 compares the SIR obtained in the embodiment, with the SIR obtained by the Chebyshev weighting, and the SIR obtained without performing the weighting (that is, performing no weighting).

It was found that in the embodiment, the value of the overall SIR is large compared to the SIR values obtained by the Chebyshev weighting and without the weighting. Hence, it was found that the interference between the side lobes of one beam and the main lobes of other beams can be reduced according to the embodiment.

As described above, the weighting vector w corresponding to the maximum eigen value of the matrix (A−βB) is obtained, the maximum $SIR_{max}$ is derived using the weighting vector w, and the reduction ratio β is determined so as to maximize the maximum $SIR_{max}$. According to this method, it is possible to positively obtain the optimum value of the weighting vector $w_c$ which maximizes the maximum $SIR_{max}$, by obtaining the reduction ratio β which maximizes the maximum $SIR_{max}$ obtained from the matrix (A−βB)).

Accordingly, it is possible to provide the wireless communication device 100 which can positively obtain the optimum weighting value for reducing the output of the side lobe in a particular direction.

Further, by providing the tolerable ratio α, and updating the maximum $SIR_{max}$ when the output power $w_w^H A w_w$ of the main lobe of the first beam (#1) is larger than the power $\alpha P_A$, it is possible to avoid a weighting which reduces the power of the main lobe and the side lobe as in the case of the SIR maximum illustrated in FIG. 11 and FIG. 12, and a high output power of the main lobe can be obtained.

In addition, although the configuration of the beam output device 100D described above includes 64 antenna elements 112D arranged in an array of 8×8 antenna elements 112D, the configuration is not limited to such a number and arrangement of the antenna elements 112D. As described in conjunction with FIG. 11 and FIG. 12, the plurality of antenna elements 112 of the beam output device 100D may have a linear arrangement.

In addition, according to the formula (4), the sum of the squares of the weighting coefficients $w_0$ through $w_{N-1}$ is set to the constant C. However, each of the weighting coefficients $w_0$ through $w_{N-1}$ may be set less than or equal to the constant C, according to the following formula (10). When the same amplifier 130D is connected to each antenna element 112, the maximum power transmittable from each antenna element 112 becomes constant. Hence, when setting each of the weighting coefficients $w_0$ through $w_{N-1}$ to the constant value or less, the formula (10) may be employed.

$$C \geq |w_k|^2 \quad (k=0,\ldots,N-1) \tag{10}$$

Figure 14:
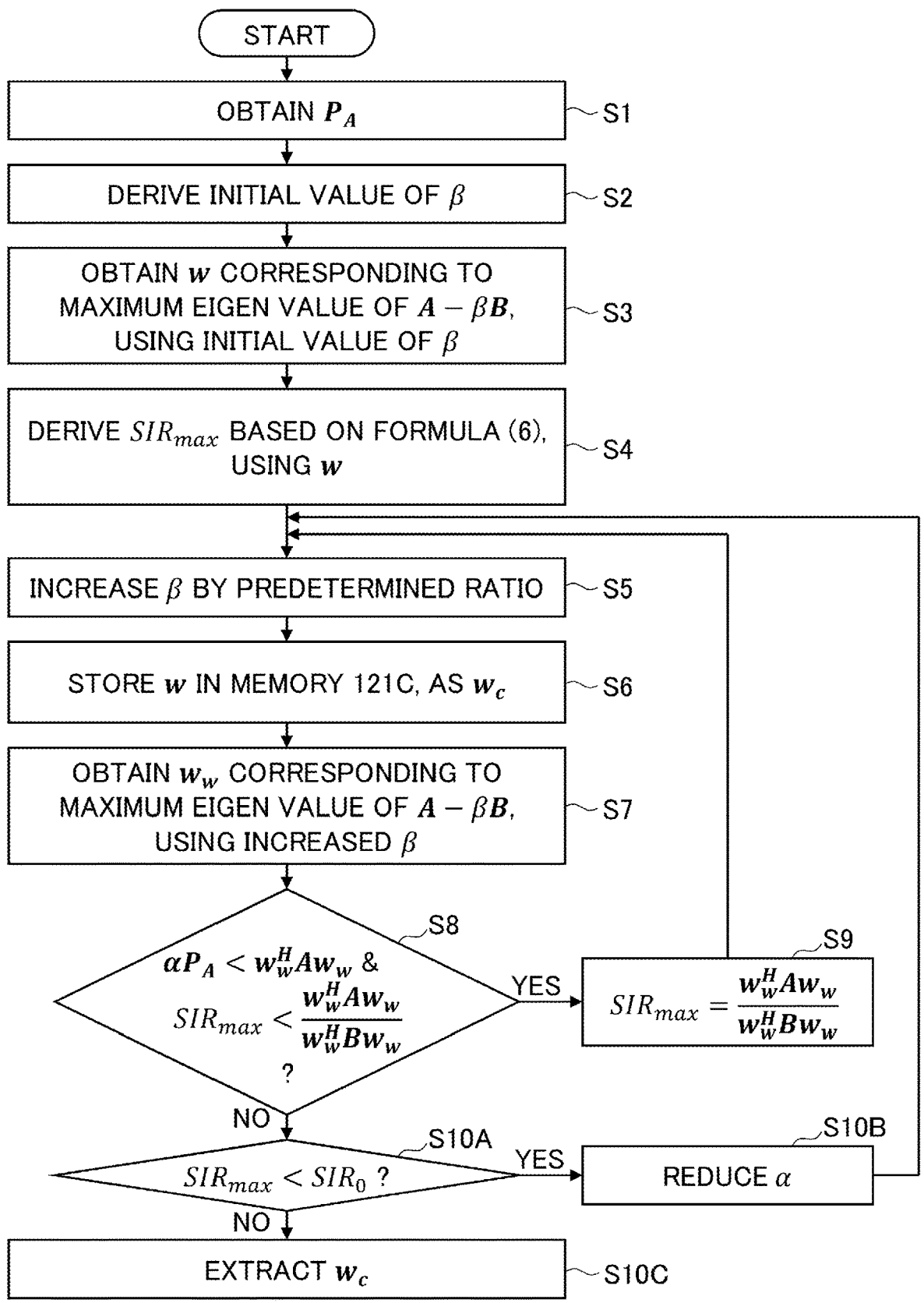
FIG. 14 is a flow chart for explaining a process executed by the control device according to a modification of one embodiment.

FIG. 14 is a flow chart illustrating a process performed by the controller 100C according to a modification of the embodiment. In FIG. 14, those steps that are the same as the corresponding steps in FIG. 10 are designated by the same reference numerals, and a description thereof will be omitted. The flow chart illustrated in FIG. 14 includes steps S10A and S10B inserted between steps S8 and S10 of the flow chart illustrated in FIG. 10. The differences of FIG. 14 from FIG. 10 will be described.

When the determination unit 118C determines in step S8 that the output power $w_w^H A w^w$ is larger than the power $\alpha P_A$, but the power ratio is not larger than the maximum $SIR_{max}$ (that is, the decision result in step S8 is NO), the determination unit 118C determines whether or not the maximum $SIR_{max}$ is smaller than a predetermined $SIR_0$, in step S10A. The predetermined $SIR_0$ is a lower limit value required for the SIR. In other words, step S10A is provided when ensuring that the maximum $SIR_{max}$ is greater than or equal to the predetermined $SIR_0$ which is the lower limit value.

When the determination unit 118C determines that the maximum $SIR_{max}$ is smaller than the predetermined $SIR_0$ (that is, a decision result in step S10A is YES), the tolerable ratio derivation unit 116C reduces the tolerable ratio $\alpha$ by the predetermined value, in step S10B. After the process of step S10B ends, the process of the flow chart returns to step S5.

After performing steps S5 through S8, when the determination unit 118C determines that the maximum $SIR_{max}$ is not smaller than the predetermined $SIR_0$ (that is, the decision result in step S10A is NO), the weighting extraction unit 120C extracts the weighting vector $w_c$ stored in the memory 121C in step S10C, as the weighting vector which is to be ultimately obtained. The process of step S10C is the same as the process of step S10 illustrated in FIG. 10.

According to the process of the flow chart illustrated in FIG. 14, it is possible to ensure that the SIR is greater than or equal to the predetermined $SIR_0$ which is the lower limit value.

According to each of the embodiments and modifications described above, it is possible to provide a wireless communication apparatus and a beam control method which can positively obtain an optimum value of the weighting for reducing the output of the side lobe in the particular direction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a plurality of antenna elements configured to output a first beam and a second beam, based on a weighting vector representing weighting with respect to at least one of a gain and a phase; and
a processor configured to perform a process including
deriving a weighting vector corresponding to a maximum eigen value of a matrix obtained by subtracting, from a first matrix representing an output power of a main lobe of the first beam, a matrix obtained by multiplying a second matrix representing an output power of a side lobe of the first beam to a reduction ratio for reducing the output power of the side lobe of the first beam interfering with a main lobe of the second beam,
determining whether or not a power ratio of the output power of the main lobe of the first beam, obtained by multiplying the weighting vector and a complex conjugate transpose of the weighting vector to the first matrix, with respect to the output power of the side lobe of the first beam, obtained by multiplying the weighting vector and the complex conjugate transpose of the weighting vector to the second matrix, is greater than a maximum Signal-to-Interference Ratio (SIR) $SIR_{max}$, and
extracting the weighting vector when determining determines that the power ratio is not larger than the maximum $SIR_{max}$.

2. The wireless communication apparatus as claimed in claim 1, wherein the deriving the weighting vector obtains an initial value of a weighting vector corresponding to a maximum eigen value of a matrix obtained by subtracting, from the first matrix, a matrix obtained by multiplying the second matrix to an initial value of the reduction ratio,
and wherein the processor performs the process further including
deriving a power ratio of an initial value of the output power of the main lobe of the first beam, obtained by multiplying the initial value of the weighting vector and a complex conjugate transpose of the initial value of the weighting vector to the first matrix, with respect to an initial value of the output power of the side lobe of the first beam, obtained by multiplying the initial value of the weighting vector and the initial value of the complex conjugate transpose of the initial value of the weighting vector to the second matrix, and
performing a first process to derive an increased reduction ratio by increasing the reduction ratio by a predetermined ratio, and
wherein the deriving the weighting vector performs a second process to obtain a weighting vector corresponding to a maximum eigen value of a matrix obtained by subtracting, from the first matrix representing the output power of the main lobe of the first beam, a matrix obtained by multiplying the second matrix to the increased reduction ratio, and
wherein the determining performs a third process to determine whether or not a power ratio of the output power of the main lobe of the first beam, obtained by multiplying the weighting vector that is obtained using the increased reduction ratio, and a complex conjugate transpose thereof, to the first matrix, with respect to the output power of the side lobe of the first beam, obtained by multiplying the weighting vector that is obtained using the increased reduction ratio, and the complex conjugate transpose thereof, to the second matrix.

3. The wireless communication apparatus as claimed in claim 2, wherein the processor performs the process further including
updating the maximum $SIR_{max}$ to the power ratio derived by the deriving the power ratio when the derived power ratio is greater than the maximum $SIR_{max}$,
wherein the first process of the performing, the second process of the deriving the weighting vector, and the third process of the determining are repeated when the updating updates the maximum $SIR_{max}$ to the power ratio derived by the deriving the power ratio.

4. The wireless communication apparatus as claimed in claim 3, wherein the processor performs the process further including
computing a maximum power at which the first beam is outputtable under a predetermined constraint, and deriving a tolerable ratio with which a reduction of the maximum power is tolerable for the output power of the main lobe of the first beam, wherein the determining determines whether or not the output power of the main lobe of the first beam obtained by multiplying the weighting vector, obtained using the increased reduction ratio, and the complex conjugate transpose thereof, to the first matrix, is larger than a power obtained by multiplying the tolerable ratio to the maximum power, and performs the third process, and wherein the updating updates the maximum $SIR_{max}$ when the determining determines that the output power of the main lobe of the first beam obtained by multiplying the weighting vector, obtained using the increased reduction ratio, and the complex conjugate transpose thereof, to the first matrix, is larger than the power obtained by multiplying the tolerable ratio to the maximum power, and the power ratio is determined to be larger than the maximum $SIR_{max}$ in the third process.

5. The wireless communication apparatus as claimed in claim 4, wherein the predetermined constraint under which the computing computes the maximum power is a maximum distance reachable by the main lobe of the first beam.

6. The wireless communication apparatus as claimed in claim 1, wherein the deriving the weighting vector derives the weighting vector under a constraint that a sum of squares of the weighting vectors is constant.

7. The wireless communication apparatus as claimed in claim 1, wherein the deriving the weighting vector derives the weighting vector under a constraint that each weighting coefficient of the weighting vector is less than or equal to a constant value.

8. A beam control method for a wireless communication apparatus having computer, and a plurality of antenna elements configured to output a first beam and a second beam, based on a weighting vector representing weighting with respect to at least one of a gain and a phase, the beam forming method comprising:

deriving, by the computer, a weighting vector corresponding to a maximum eigen value of a matrix obtained by subtracting, from a first matrix representing an output power of a main lobe of the first beam, a matrix obtained by multiplying a second matrix representing an output power of a side lobe of the first beam to a reduction ratio for reducing the output power of the side lobe of the first beam interfering with a main lobe of the second beam;

determining, by the computer, whether or not a power ratio of the output power of the main lobe of the first beam, obtained by multiplying the weighting vector and a complex conjugate transpose of the weighting vector to the first matrix, with respect to the output power of the side lobe of the first beam, obtained by multiplying the weighting vector and the complex conjugate transpose of the weighting vector to the second matrix, is greater than a maximum Signal-to-Interference Ratio (SIR) $SIR_{max}$; and extracting, by the computer, the weighting vector when determining determines that the power ratio is not larger than the maximum $SIR_{max}$.

9. The beam forming method as claimed in claim 8, wherein the deriving the weighting vector obtains an initial value of a weighting vector corresponding to a maximum eigen value of a matrix obtained by subtracting, from the first matrix, a matrix obtained by multiplying the second matrix to an initial value of the reduction ratio, the beam forming method further comprising:

deriving, by the computer, a power ratio of an initial value of the output power of the main lobe of the first beam, obtained by multiplying the initial value of the weighting vector and a complex conjugate transpose of the initial value of the weighting vector to the first matrix, with respect to an initial value of the output power of the side lobe of the first beam, obtained by multiplying the initial value of the weighting vector and the initial value of the complex conjugate transpose of the initial value of the weighting vector to the second matrix, and performing, by the computer, a first process to derive an increased reduction ratio by increasing the reduction ratio by a predetermined ratio, and wherein the deriving the weighting vector performs a second process to obtain a weighting vector corresponding to a maximum eigen value of a matrix obtained by subtracting, from the first matrix representing the output power of the main lobe of the first beam, a matrix obtained by multiplying the second matrix to the increased reduction ratio, and wherein the determining performs a third process to determine whether or not a power ratio of the output power of the main lobe of the first beam, obtained by multiplying the weighting vector that is obtained using the increased reduction ratio, and a complex conjugate transpose thereof, to the first matrix, with respect to the output power of the side lobe of the first beam, obtained by multiplying the weighting vector that is obtained using the increased reduction ratio, and the complex conjugate transpose thereof, to the second matrix.

10. The beam forming method as claimed in claim 9, further comprising:

updating, by the computer, the maximum $SIR_{max}$ to the power ratio derived by the deriving the power ratio when the derived power ratio is greater than the maximum $SIR_{max}$, wherein the first process of the performing, the second process of the deriving the weighting vector, and the third process of the determining are repeated when the updating updates the maximum $SIR_{max}$ to the power ratio derived by the deriving the power ratio.

11. The beam forming method as claimed in claim 10, further comprising:

computing, by the computer, a maximum power at which the first beam is outputtable under a predetermined constraint, and deriving, by the computer, a tolerable ratio with which a reduction of the maximum power is tolerable for the output power of the main lobe of the first beam, wherein the determining determines whether or not the output power of the main lobe of the first beam obtained by multiplying the weighting vector, obtained using the increased reduction ratio, and the complex conjugate transpose thereof, to the first matrix, is larger than a power obtained by multiplying the tolerable ratio to the maximum power, and performs the third process, and wherein the updating updates the maximum $SIR_{max}$ when the determining determines that the output power of the main lobe of the first beam obtained by multiplying the weighting vector, obtained using the increased reduction ratio, and the complex conjugate transpose thereof, to the first matrix, is larger than the power obtained by multiplying the tolerable ratio to the maximum power, and the power ratio is determined to be larger than the maximum $SIR_{max}$ in the third process.

12. The beam forming method as claimed in claim 11, wherein the predetermined constraint under which the computing computes the maximum power is a maximum distance reachable by the main lobe of the first beam.

13. The beam forming method as claimed in claim 8, wherein the deriving the weighting vector derives the weighting vector under a constraint that a sum of squares of the weighting vectors is constant.

14. The beam forming method as claimed in claim 8, wherein the deriving the weighting vector derives the weighting vector under a constraint that each weighting coefficient of the weighting vector is less than or equal to a constant value.

* * * * *